(12) United States Patent
Kuno et al.

(10) Patent No.: US 10,976,554 B2
(45) Date of Patent: Apr. 13, 2021

(54) LIGHT GUIDE PLATE AND IMAGE DISPLAY APPARATUS

(71) Applicant: Hitachi-LG Data Storage, Inc., Tokyo (JP)

(72) Inventors: Takuma Kuno, Tokyo (JP); Ryuji Ukai, Tokyo (JP); Toshiteru Nakamura, Tokyo (JP); Satoshi Ouchi, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 16/571,499

(22) Filed: Sep. 16, 2019

(65) Prior Publication Data

US 2020/0233217 A1 Jul. 23, 2020

(30) Foreign Application Priority Data

Jan. 23, 2019 (JP) .............................. JP2019-009516

(51) Int. Cl.
*G02B 27/01* (2006.01)
*F21V 8/00* (2006.01)
*G02B 27/00* (2006.01)

(52) U.S. Cl.
CPC ....... *G02B 27/0172* (2013.01); *G02B 6/0023* (2013.01); *G02B 6/0035* (2013.01); *G02B 27/0081* (2013.01); *G02B 2027/0118* (2013.01)

(58) Field of Classification Search
CPC ............ G02B 27/0172; G02B 27/0081; G02B 6/0023; G02B 6/0035; G02B 2027/0081

USPC ........................................................... 385/36
See application file for complete search history.

(56) References Cited

U.S. PATENT DOCUMENTS

| 2003/0165017 A1 | 9/2003 | Amitai |
| 2017/0227779 A1* | 8/2017 | Kato ........................ H04N 5/64 |
| 2019/0212487 A1* | 7/2019 | Danziger ........... G02B 27/0081 |

FOREIGN PATENT DOCUMENTS

JP 2003-536102 A 12/2003

* cited by examiner

*Primary Examiner* — Jerry M Blevins
(74) *Attorney, Agent, or Firm* — Mattingly & Malur, PC

(57) ABSTRACT

A light guide plate includes: first and second internal reflective surfaces that are approximately parallel and propagate incoming image light while totally reflecting the image light; a partially reflective surface array that has a plurality of partially reflective surfaces arranged in a direction of propagating image light, the partially reflective surfaces being inclined at a predetermined angle and partially reflecting the image light; and a uniforming element that uniforms intensity distribution of image light which is reflected by the partially reflective surface array to be projected from the light guide plate. As the uniforming element, the partially reflective surface array is divided into a plurality of segments along a direction of propagating image light, and the inter-surface spacing of the partially reflective surfaces or the reflectivity of the partially reflective surfaces is configured to vary from segment to segment.

10 Claims, 15 Drawing Sheets

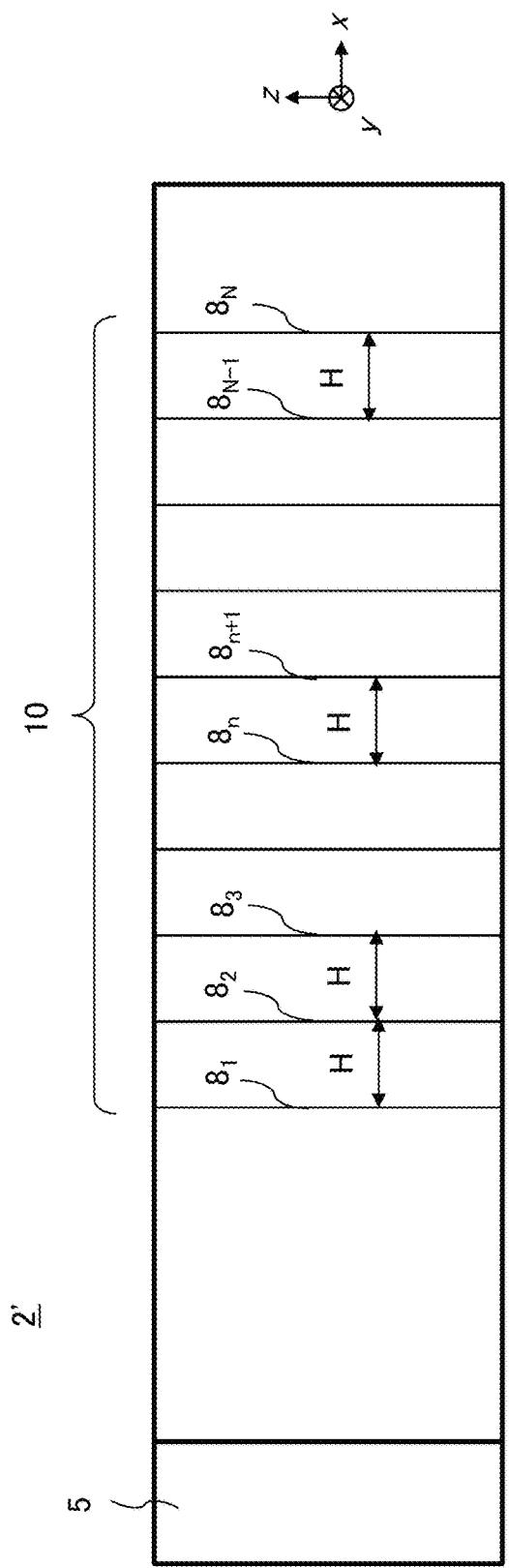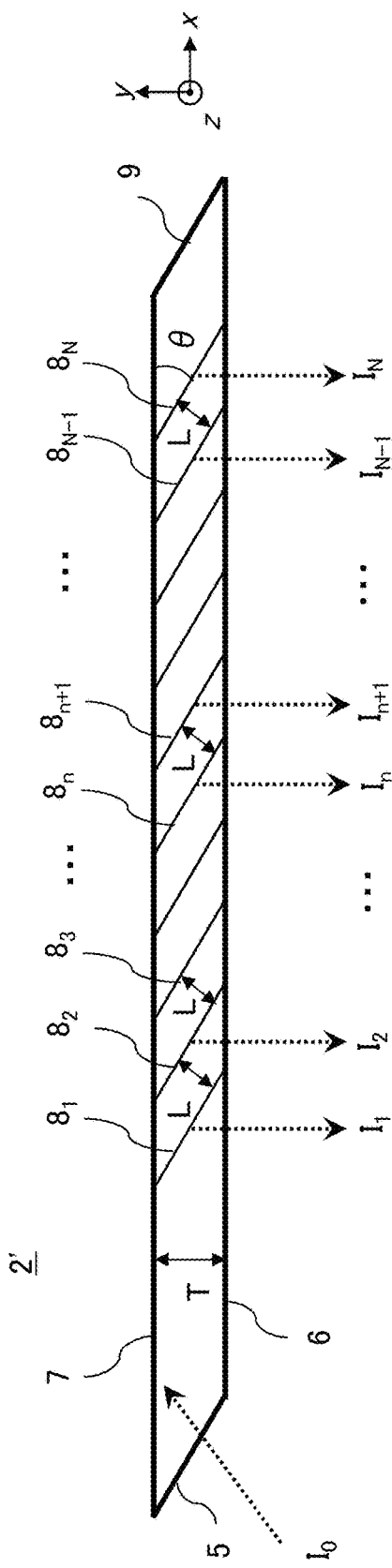

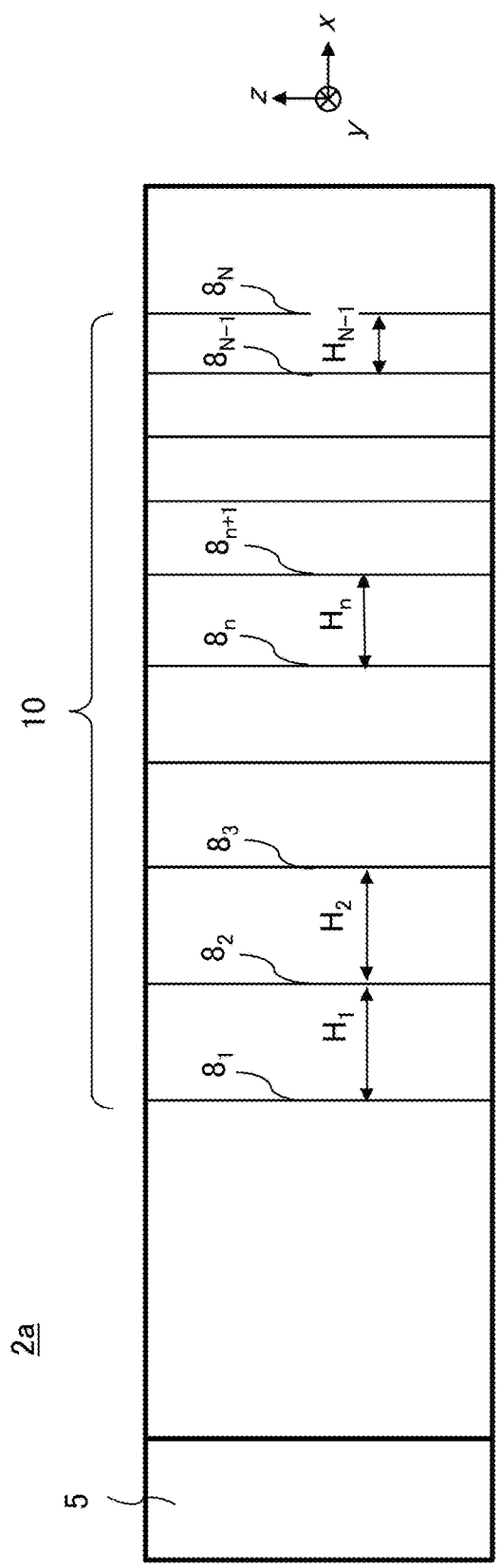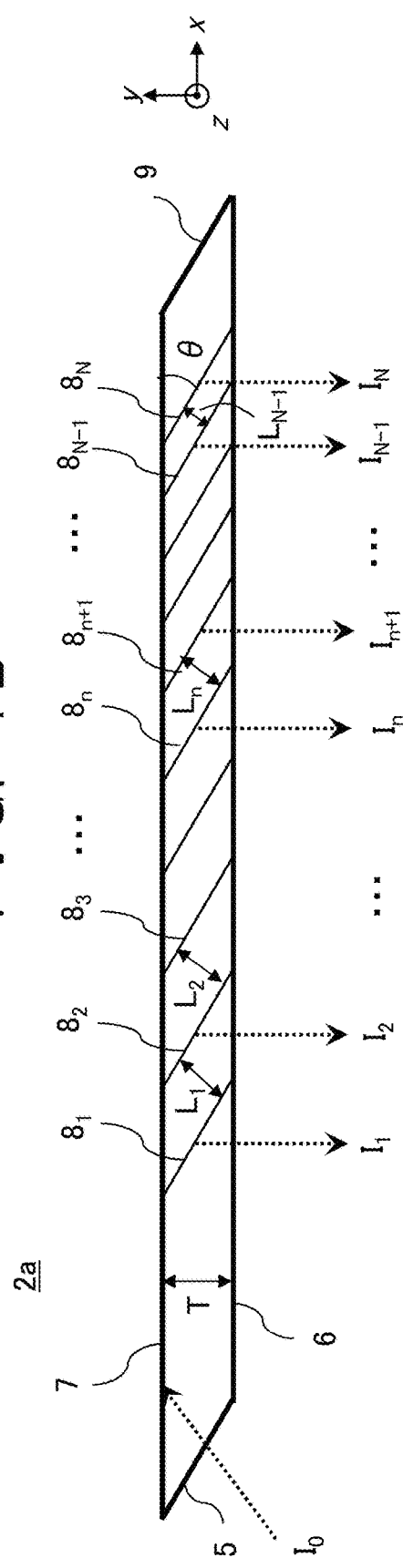

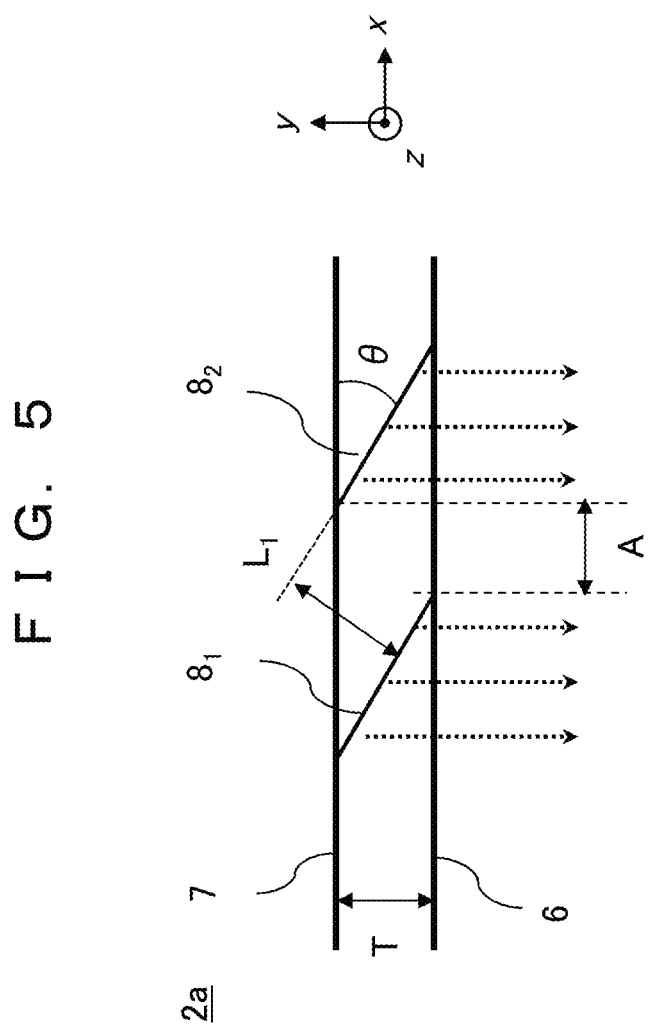

INTENSITY DISTRIBUTION OF IMAGE LIGHT

CONVENTIONAL LIGHT GUIDE PLATE 2'

LIGHT GUIDE PLATE OF EMBODIMENT 2a

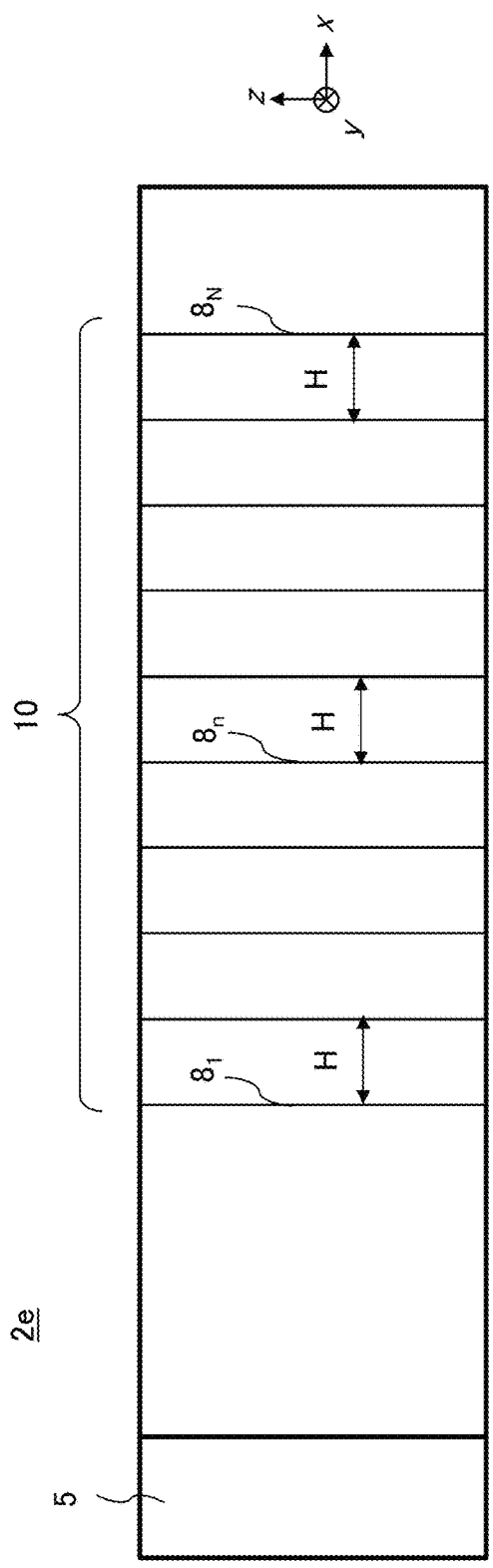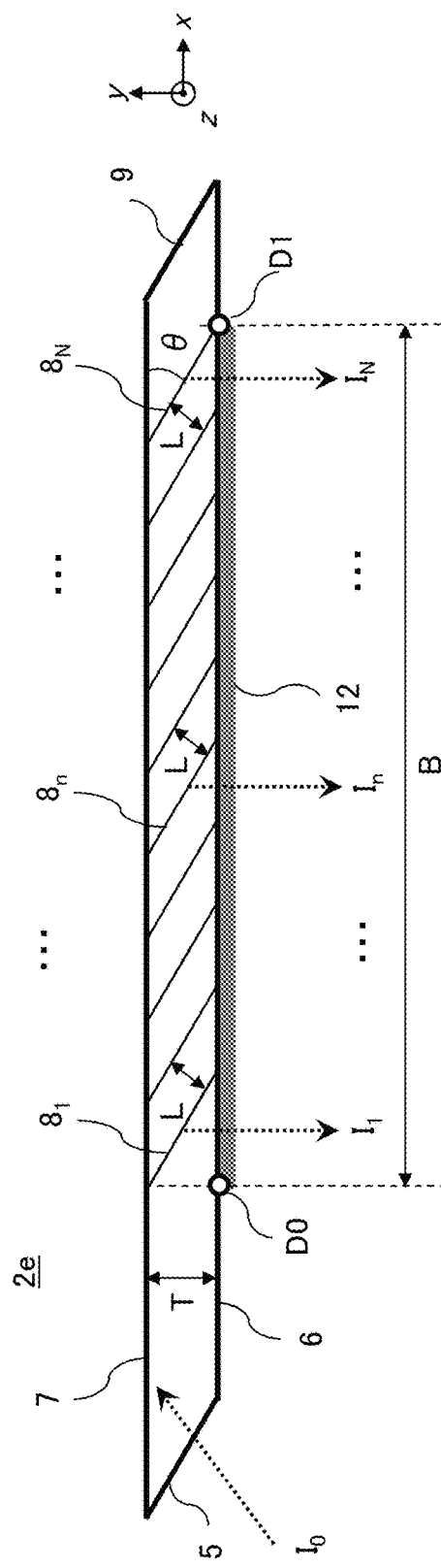

LIGHT GUIDE PLATE AND IMAGE DISPLAY APPARATUS

CLAIM OF PRIORITY

The present application claims priority from Japanese patent application serial No. JP 2019-009516, filed on Jan. 23, 2019, the content of which is hereby incorporated by reference into this application.

BACKGROUND OF THE INVENTION

(1) Field of the Invention

The present invention relates to a light guide plate that propagates and projects incoming image light, and an image display apparatus.

(2) Description of the Related Art

A light guide plate used in image display apparatus, such as a head-mounted display, a head-up display and the like, has the function of extending an eye box through expansion and projecting an image to a user. As technology of pupil expansion, for example, Japanese Unexamined Patent Application Publication (Translation of PCT Application) No. 2003-536102 discloses "an optical device including a light-transmitting substrate, optical means for coupling light into the substrate by total internal reflection, and a plurality of partially reflective surfaces carried by the substrate, in which the partially reflective surfaces are parallel to each other and are not parallel to any of the edges of the substrate".

SUMMARY OF THE INVENTION

There is a need for the light guide plate to have high see-through characteristics to prevent a user's view from being blocked, in addition to extend the eye box to a predetermined size by pupil expansion. In particular, the head-mounted displays are designed in mind to be used in the aid in daily life, in work support such as in maintenance and checkups and the like. Accordingly, the light guide plate and the entire image display apparatus including the light guide plate are required to have high light use efficiency in order to provide bright display image.

In the configuration disclosed in Japanese Unexamined Patent Application Publication (Translation of PCT Application) No. 2003-536102, the partially reflective surfaces are placed as a light guide plate (optical device) in the interior of the transparent substrate in order to project image light toward the user. However, while the image light propagates through the light guide plate and is projected by the partially reflective surfaces, the amount of image light propagating through the light guide plate gradually decreases. This makes it impossible to project the image light of uniform brightness. In addition, if the reflectivity of the partially reflective surfaces is increased to achieve high light use efficiency, the nonuniformity of brightness of the image right will likely become increasingly salient. Thus, it is difficult to project image light of uniform brightness in the light guide plate with maintenance of high light use efficiency.

The present invention has been achieved in view of such problems, and it is an object to provide a light guide plate capable of projecting image light of uniform brightness with high light use efficiency, and an image display apparatus.

To achieve the object, a light guide plate according to an aspect of the present invention includes: an incident surface which image light enters; first and second internal reflective surfaces that are approximately parallel to each other and propagate incoming image light while totally reflecting the incoming image light; a partially reflective surface array that is placed in an interior sandwiched between the first and second internal reflective surfaces, and has a plurality of partially reflective surfaces arranged therein in a direction of propagating image light, the plurality of partially reflective surfaces being inclined at a predetermined angle and partially reflecting the image light; and a uniforming element that uniforms intensity distribution of image light which is reflected by the partially reflective surface array to be projected from the light guide plate.

Specifically, as the uniforming element, the partially reflective surface array is divided into a plurality of segments along the direction of propagating image light, and the uniforming element has different optical configurations between the segments. For example, an inter-surface spacing L of the partially reflective surfaces or the reflectivity R of the partially reflective surfaces is configured to vary from segment to segment.

According to the present invention, a light guide plate capable of projecting image light of uniform brightness with high light use efficiency and an image display apparatus can be provided.

BRIEF DESCRIPTION OF THE DRAWINGS

These and other features, objects and advantages of the present invention will become more apparent from the following description when taken in conjunction with the accompanying drawings wherein:

FIGS. 2A and 2B are diagrams illustrating an example configuration of a conventional light guide plate 2';

FIGS. 4A and 4B are diagrams illustrating the configuration of a light guide plate 2a according to the first embodiment;

FIG. 5 is an explanatory diagram of the inter-surface spacing condition with consideration of a thickness of the light guide plate 2a;

FIGS. 14A and 14B are diagrams illustrating the configuration of a light guide plate 2e according to a fifth embodiment.

DETAILED DESCRIPTION OF THE EMBODIMENT

Some of embodiments according to the present invention will now be described with reference to the accompanying drawings. Each embodiment has a uniforming element that uniforms brightness of image light projected from a light guide plate. Throughout the figures, like reference signs refer to elements having the same or similar functions, but different reference signs 2a to 2f are used to designate a light guide plate 2 for distinctions among first to sixth embodiments.

First Embodiment

In a first embodiment, the uniforming element is configured to set different spacings between the partially reflective surfaces within the light guide plate.

Figure 1:
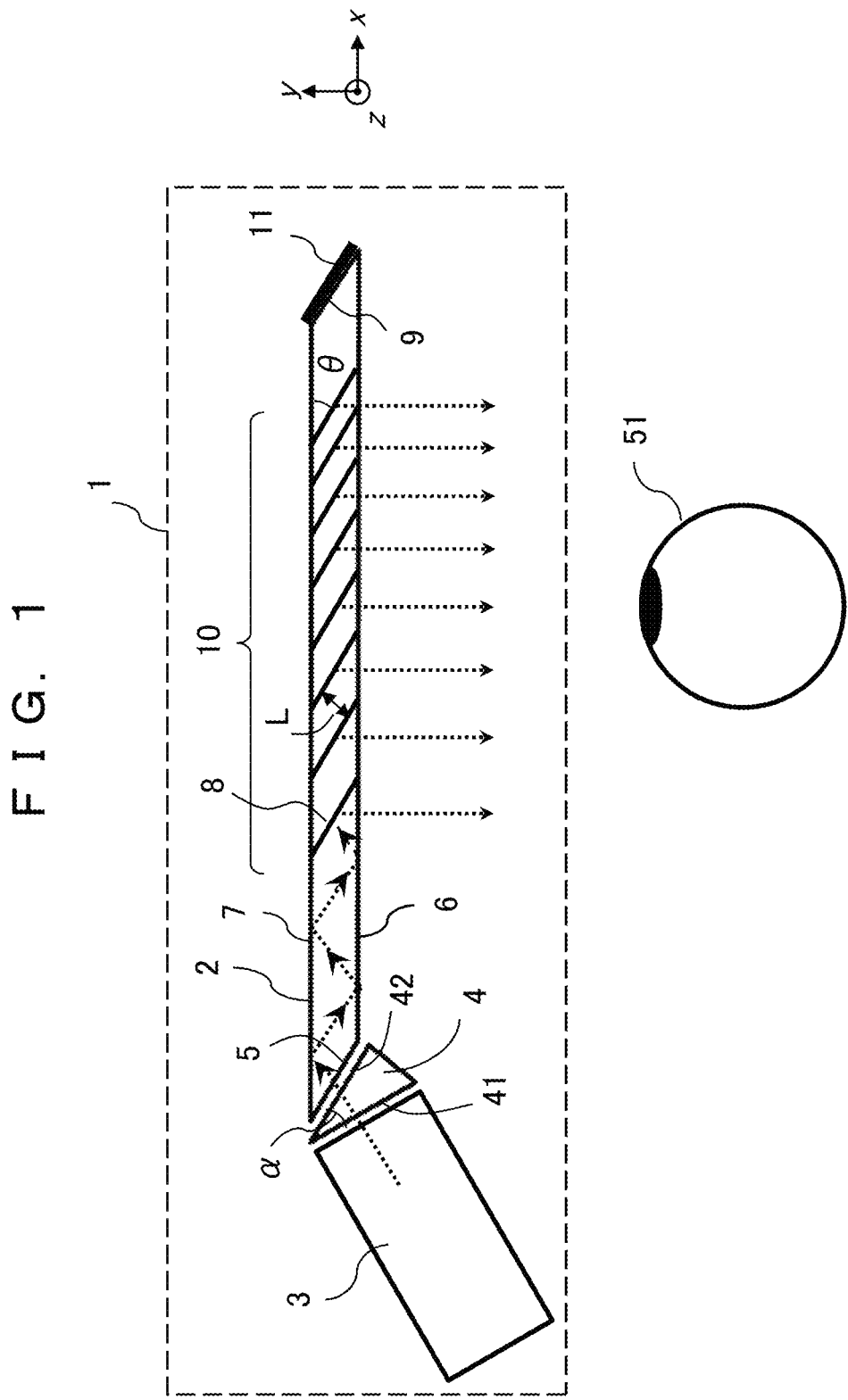
FIG. 1 is a diagram illustrating the configuration of an image display apparatus 1 according to a first embodiment.

FIG. 1 is a schematic diagram illustrating the configuration of an image display apparatus 1 according to the first embodiment, in which a user watches an image from the image display apparatus 1. Assuming that the left-right direction with respect to the user (user's pupil 51) is defined as the x axis, the front-rear direction (line-of-sight direction) is defined as the y axis and the up-down direction is defined as the z axis, and here an x-y sectional view is shown when seen from above the user's head. The image display apparatus 1 includes an image generation unit 3, a coupling prism 4, and a light guide plate 2a which is placed along the x axis.

The image generation unit 3 generates an image to be watched by the user, and then emits the image light to the coupling prism 4. The coupling prism 4 couples the image generation unit 3 and the light guide plate 2a to each other in order to direct the image light emitted from the image generation unit 3, toward the light guide plate 2a. Specifically, the coupling prism 4 has a first surface 41 and a second surface 42 which form a vertex angle α. The image light enters from the image generation unit 3 to the fist surface 41 and then exits from the second surface 42 to be incident to an incident surface 5 of the light guide plate 2a.

The light guide plate 2a propagates in the x direction the image light entering through the incident surface 5, and uses a plurality of partially reflective surfaces 8 to project the image light in the y direction toward the user's pupil 51 so that the user can visually recognize the image. At this time, an exit pupil is configured to be expanded in the x direction in order to expand an eye box (the range where the user can visually recognize the image). It is noted that the coupling prism 4 may be configured to have the function of enlarging the exit pupil in the z direction to expand the eye box in the z direction.

The light guide plate 2a includes a first internal reflective surface 6 and a second internal reflective surface 7 which are approximately parallel to each other. The light guide plate 2a has a partially reflective surface array 10 in the interior sandwiched between the first internal reflective surface 6 and the second internal reflective surface 7. The partially reflective surface array 10 has the plurality of partially reflective surfaces 8 which are arranged at an inclination angle θ in the x direction. The image light entering from the coupling prism 4 through the incident surface 5 is totally reflected by the first internal reflective surface 6 and the second internal reflective surface 7 to propagate in the x direction. Also, a portion of the image light propagating in the x direction is reflected off the plurality of partially reflective surfaces 8 to be redirected in the y direction, which then passes through the first internal reflective surface 6 to exit to the outside of the light guide plate 2a. At this time, the image light reflected off the plurality of partially reflective surfaces 8 is replicated, so that the eye box is expanded in the x direction.

A portion of the image light exiting to the outside of the light guide plate 2a enters the user's pupil 51. Thus, the user can visually recognize the image displayed by the image display apparatus 1. The higher the reflectivity of the partially reflective surfaces 8, the greater the amount of image light projected to the user, resulting in a light guide plate with high light use efficiency.

An end 9 of the light guide plate 2a is formed to be approximately parallel to the incident surface 5, and prevented from being orthogonal to the first and second internal reflective surfaces 6, 7. The light guide plate end 9 has preferably a polished surface rather than a sand surface (ground glass surface). Thereby, the image light, which has been totally reflected to propagate in the interior of the light guide plate 2a and then has passed through all the partially reflective surfaces 8, becomes apt to pass through the light guide plate end 9 to make stray light unlikely.

It is noted that a light shield unit 11 may be installed on the outside of the light guide plate end 9 in order to block the light passing through the light guide plate end 9. The light shield unit 11 includes a light shield wall, a light shield block, a light shield sheet and/or the like, and is capable of reducing the stray light visually recognized by the user.

In the light guide plate 2a according to the first embodiment, an inter-surface spacing L of the plurality of partially reflective surfaces 8 arranged in the partially reflective surfaces array 10 is varied in the arrangement direction, whereby the high light use efficiency can be maintained as well as the light quantity distribution of the projected image light can be uniformed.

<Configuration and Performance of Conventional Light Guide Plate 2'>

A configuration of conventional light guide plates and issues involved therein are discussed for the purpose of comparison.

FIGS. 2A and 2B are diagrams illustrating an example configuration of a conventional light guide plate 2', in which FIG. 2A shows a front view when seen from the user, and FIG. 2B shows a plan view (x-y sectional view).

The light guide plate 2' includes the first internal reflective surface 6 and the second internal reflective surface 7 which are approximately parallel to each other. The light guide plate 2' has the partially reflective surface array 10 including the plurality of partially reflective surfaces 8 arranged therein. The conventional light guide plate 2' has an equal inter-surface spacing L for all the partially reflective surfaces 8, and all the partially reflective surfaces 8 are also equal in reflectivity. In this configuration, there is an issue on non-uniform light quantity distribution of the projected image light.

The number N of partially reflective surfaces 8 are individually denoted as $8_n$ in order from the incident surface 5 (n is an integer from 1 to N). It is assumed that reflectivity of each partially reflective surface 8 is R (where 0<R<1) and that an inter-surface spacing in a direction perpendicular to the reflecting surfaces of adjacent partially reflective surfaces 8 is L. It is also assumed that spacing between adjacent partially reflective surfaces 8 on the first internal reflective surface 6 (or the second internal reflective surface 7) is width H. Further it is assumed that intensity of light entering through the incident surface 5 of the light guide plate is $I_0$, that intensity of light reflected off the partially reflective surface $\mathbf{8}_n$ is $I_n$, and that intensity of light per unit length between light beams $I_n$ and $I_{n+1}$ is $U_n$.

The following relationship is between the inter-surface spacing L and width H of the partially reflective surfaces 8 when the angle formed by the partially reflective surface 8 and the second internal reflective surface 7 is assumed as θ.

$$L = H \times \sin\theta \tag{1}$$

Also, using the reflectivity R of the partially reflective surface $\mathbf{8}_n$, $I_n$ is represented as:

$$I_n = (1-R)^{n-1} \times R \times I_0 \tag{2}$$

The light intensity $U_1$ per unit length between light beams $I_1$ and $I_2$ is equal to a value obtained by dividing a mean value of light intensity of $I_1$ and $I_2$ by width H.

$$U_1 = (I_1 + I_2)/2/H \tag{3}$$

Likewise, the light intensity $U_n$ per unit length between light beams $I_n$ and $1_{n+1}$ is represented as:

$$U_n = (I_n + I_{n+1})/2/H \tag{4}$$

Next, available reflectivity of the partially reflective surfaces 8 of the conventional light guide plate 2' is determined. When the degree of uniformity K of the image light projected by the light guide plate is defined by use of a ratio between the light intensity $U_1$ per unit length in a position closet to the incident surface 5 and the light intensity $U_{N-1}$ per unit length in a position farthest from the incident surface 5, i.e., $U_{N-1}/U_1$, it is represented as:

$$K = U_{N-1}/U_1 = (1-R)^{N-2} \tag{5}$$

In this manner, as to the number N of partially reflective surfaces 8, the larger the N is, the lower the degree of uniformity K is. As to the reflectivity R, there is a tradeoff relationship in which the higher the reflectivity R is, the higher the light use efficiency is achieved, but the degree of uniformity decreases. The degree of uniformity K of 0.5 or greater, more preferably, 0.7 or greater, is required for the user to recognize visually an image of uniform brightness.

Here, the N partially reflective surfaces 8 and the reflectivity R are connected with the visibility width viewed by the user.

Figure 3:
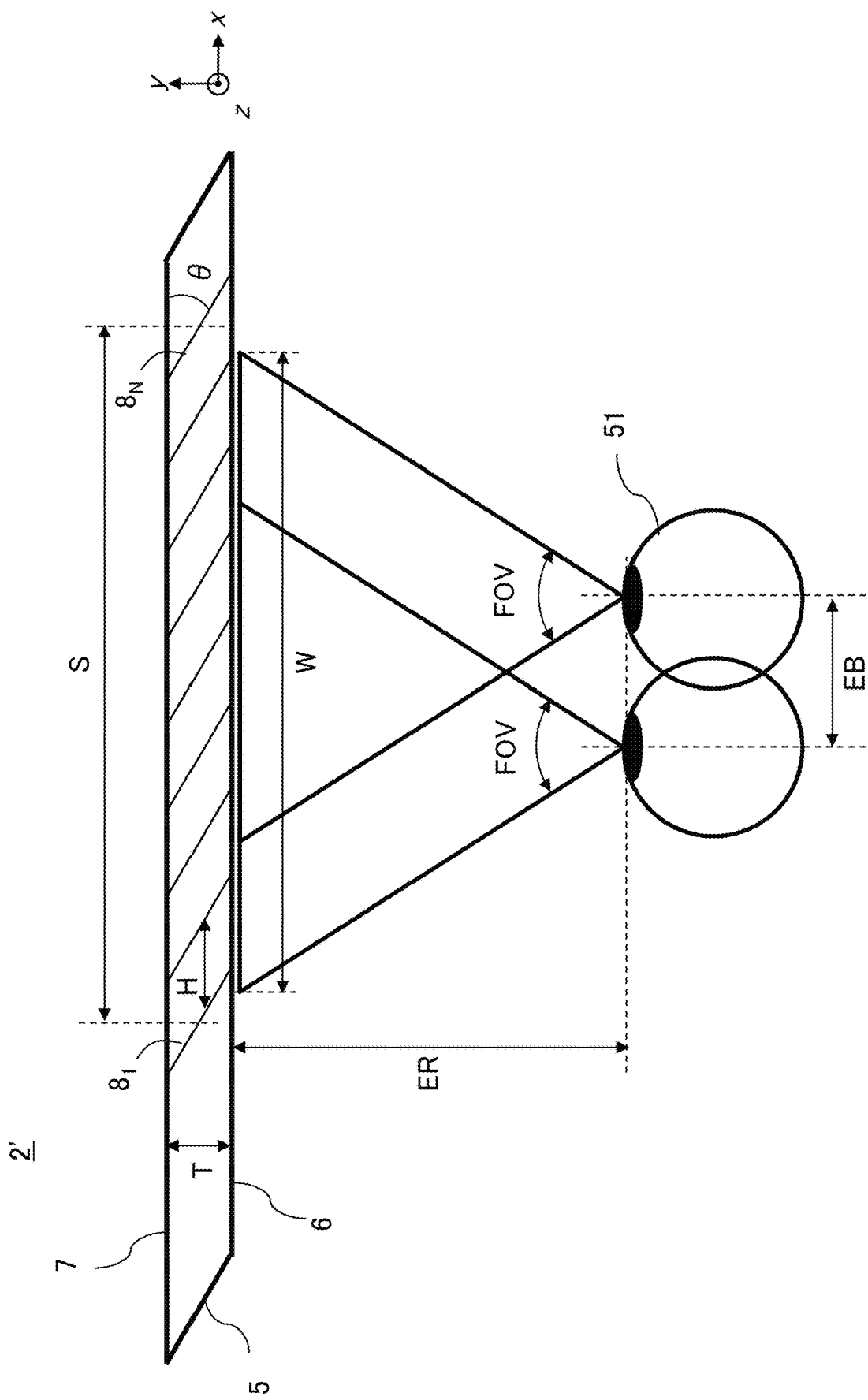
FIG. 3 is a diagram illustrating the positional relationship between a user's pupils and a light guide plate.

FIG. 3 is a diagram illustrating the positional relationship between the user's pupils and the light guide plate 2', and using the positional relationship, a required number of partially reflective surfaces 8 is determined. It is assumed that the distance from the midpoint of the partially reflective surface 81 closest to the incident surface 5 to the midpoint of the partially reflective surface $\mathbf{8}_N$ farthest from the incident surface 5 is S. Using the width H and the N partially reflective surfaces, the distance S has the following relationship:

$$S = H \times (N-1) \tag{6}$$

Further, it is assumed that the distance from the user's pupils 51 to the first internal reflective surface 6 (eye relief) is ER, the eye box in the x direction is EB, and the full angle of field of view in the x direction of the displayed image is FOV (Field of View). From them, the length in the x direction of the existence region of the partially reflective surfaces 8 minimally required to display images is determined to be W (hereinafter referred to as a "visibility width W"). In order to allow the user to recognize visually the entire image, the distance S should have a length equal to or greater than the visibility width W. Thus, the following relationship must be established:

$$S \geq W = EB + 2 \times ER \times \tan(FOV/2) \tag{7}$$

As a concrete example, consider where the light guide plate has a thickness T=1.7 mm, the partially reflective surfaces are spaced at spacing H=2 mm, the eye relief ER=20 mm, and the eye box EB=10 mm. When the minimum required N number of partially reflective surfaces is determined from expressions (6) and (7), in the case of 20 degrees≤FOV<30 degrees, N is equal to 10 partially reflective surfaces; in the case of 30 degrees≤FOV<40 degrees, N is equal to 12; and in the case of 40 degrees≤FOV<50 degrees, N is equal to 14.

Further, a condition of reflectivity R for achievement of a desirable degree of uniformity K≥0.7 to allow the user to recognize visually an image of uniform brightness is determined from the minimum required N number of partially reflective surfaces and expression (5). As a result, reflectivity R≤5% is required where 20 degree≤FOV<30 degree; reflectivity R≤4% is required where 30 degree≤FOV<40 degree; and reflectivity R≤3% is required where 40 degree≤FOV<50 degree. If the reflectivity R of the partially reflective surface exceeds the value, an image of uniform brightness cannot be provided.

Figure 6C:
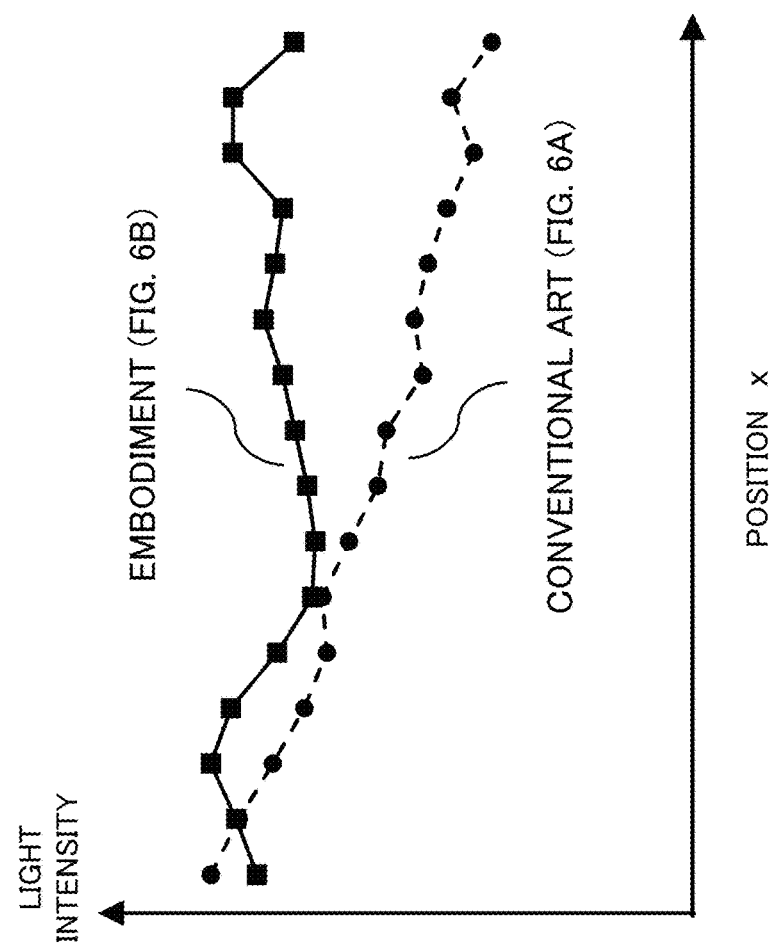
FIGS. 6A, 6B and 6C are diagrams showing the results of the simulation of image-light intensity distribution.
Figure 6A:
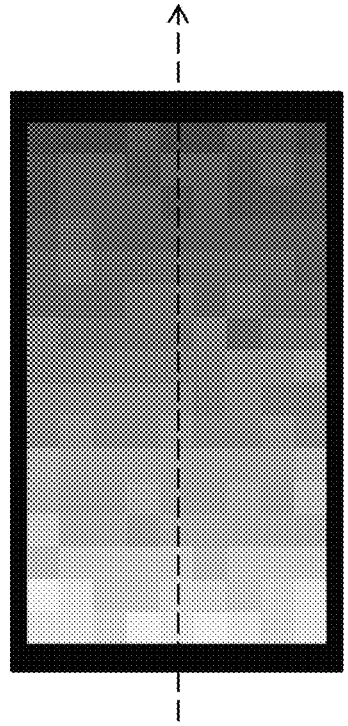
Figure 6B:
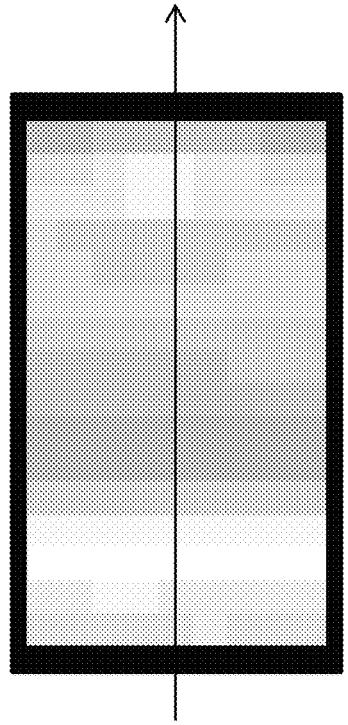

FIGS. 6A to 6C are diagrams showing the results of the simulations of image-light intensity distribution. FIG. 6A shows the case where, in the conventional light guide plate 2', when the reflectivity R of the partially reflective surface is equal to 10% (a value higher than the above upper limit), image light with diagonal FOV=40 degrees is projected. FIG. 6C shows the intensity distribution along the x axis in the vertical central position. It is shown that, in the conventional light guide plate 2', the image light is lower gradually toward the right of the display area, and the brightness distribution of the displayed image becomes non-uniform. In this way, in the conventional light guide plate 2', the reflectivity of the partially reflective surface is required to be set at a lower value in order to project an image light of uniform brightness, leading to impossibility of achieving high light use efficiency.

<Configuration and Performance of Light Guide Plate 2a in Embodiment>

FIGS. 4A and 4B are diagrams illustrating the configuration of the light guide plate 2a according to the first embodiment illustrated in FIG. 1, in which FIG. 4A is a front view and FIG. 4B is a plan view. The light guide plate 2a according to the embodiment differs from the conventional light guide plate 2' in FIG. 2 in that the inter-surface spacings L of the N partially reflective surfaces 8 are narrower from the light-guide-plate incident surface 5 toward the light guide plate end 9. It is noted that the N partially reflective surfaces 8 are approximately equal in reflectivity R. The amount of image light totally reflected to propagate in the interior of the light guide plate 2a decreases as the image light travels from the incident surface 5 toward the light guide plate end 9 because of partial reflection on the partially reflective surfaces 8. In compensation for this, the inter-surface spacings L of the partially reflective surfaces 8 are narrower from the incident surface 5 toward the light guide plate end 9 in order to increase the luminous flux density of the image light for brightness uniformization of the image light to be projected. As a result, although the light guide plate 2a adopts the partially reflective surfaces 8 having approximately equal reflectivity, the projection of image light of uniform brightness is enabled.

The following description is about the inter-surface spacing L and the reflectivity R of partially reflective surfaces.

<About Inter-surface Spacing L of Partially Reflective Surfaces 8>

The spacing between the n-th partially reflective surface $8_n$ and the (n+1)-th partially reflective surface $8_{n+1}$ is denoted as $L_n$ (n is an integer from 1 to N−1). Also, the spacing between the n-th partially reflective surface and the (n+1)-th partially reflective surface on the first internal reflective surface 6 (or the second internal reflective surface 7) is denoted as width $H_n$.

To display an image of uniform brightness, a desirable inter-surface spacing of the partially reflective surfaces 8 is described. It is assumed that intensity of light entering through the incident surface 5 of the light guide plate is $I_0$, that intensity of light reflected off the partially reflective surface $8_n$ is $I_n$, that and intensity of light per unit length between light beams $I_n$ and $I_{n+1}$ is $U_n$. The width $H_n$ and the inter-surface spacing $L_n$ of the partially reflective surfaces $8_n$ have the following relationship:

$$L_n = H_n \times \sin\theta \quad (8)$$

Also, using the reflectivity R of the partially reflective surface 8, $I_n$ is represented as:

$$I_n = (1-R)^{n-1} \times R \times I_0 \quad (9)$$

Assuming that intensity of light per unit length between light beams $I_1$ and $I_2$ is $U_1$, the light intensity $U_1$ can be expressed as a value obtained by dividing a mean value of light intensity of $I_1$ and $I_2$ by width $H_1$.

$$U_1 = (I_1 + I_2)/2/H_1 \quad (10)$$

Likewise, the light intensity $U_n$ per unit length between light beams $I_n$ and $1_{n+1}$ is represented as:

$$U_n = (I_n + I_{n+1})/2/H_n \quad (11)$$

The relationship between adjacent inter-surface spacings $L_n$ and $L_{n+1}$ is determined. The larger n (the closer to the light guide plate end 9 from the incident surface 5), the smaller the light intensity $I_n$. Because of this, in order to uniform the image light to be projected, the inter-surface spacing $L_n$ is decreased as n increases. Thus, the relationship $L_{n+1} < L_n$ is established.

Next, the lower limit of $L_{n+1}$ is determined. The image light to be projected is uniformed by equalizing adjacent light intensities $U_n$ and $U_{n+1}$ per unit length. If the relationship between the inter-surface spacings $L_n$ and $L_{n+1}$ is determined from expressions (8) to (11), $L_{n+1} = (1-R)L_n$ is obtained. In this case, if $L_{n+1}$ is lower than $(1-R)L_n$, the too small inter-surface spacing will cause an increase in number of the partially reflective surfaces, leading to increases in manufacturing cost. Therefore, the relationship between the inter-surface spacings $L_n$ and $L_{n+1}$ is defined within the following range:

$$(1-R)L_n \leq L_{n+1} < L_n \quad (12)$$

TO allow the user to recognize visually an image of uniform brightness, the degree of uniformity is required to be K≥0.5. Therefore, when the number of partially reflective surfaces is N, the inter-surface spacing $L_{n+1}$ is required to fall within the following range:

$$(1-R)L_n \leq L_{n+1} < (1-R)L_n/0.5^{(1/(N-2))} \quad (13)$$

Further, to obtain a more desirable degree of uniformity K≥0.7, the inter-surface spacing $L_{n+1}$ is required to fall within the following range:

$$(1-R)L_n \leq L_{n+1} < (1-R)L_n/0.7^{(1/(N-2))} \quad (14)$$

FIG. 5 is an explanatory diagram of the inter-surface spacing condition with consideration of the thickness of the light guide plate 2a. If the inter-surface spacing L between adjacent partially reflective surfaces 8 is large, no projected light exists in a region A to give rise to a partial loss of the image. In order to prevent a partial loss of the image, what is required is only that, when the user views the light guide plate from the front, the partially reflective surfaces 8 are configured to look overlapping one another. For this purpose, assuming that the thickness of the light guide plate is T and the angle formed by the partially reflective surface 8 and the second internal reflective surface 7 is θ, the largest inter-surface spacing $L_1$ between the first partially reflective surface 81 and the second partially reflective surface 82 desirably satisfies the following:

$$L_1 \leq T \times \cos\theta \quad (15)$$

Also, the too small inter-surface spacing of partially reflective surfaces 8 causes an increase in number of the partially reflective surfaces 8. Therefore, in terms of the lowering of costs, $L_1$ desirably satisfies the following:

$$L_1 \leq T \times \cos\theta/2 \quad (16)$$

The above is the condition of the inter-surface spacing L of the partially reflective surfaces 8 for displaying an image of uniform brightness.

<About Reflectivity of Partially Reflective Surface 8>

The following is a description of the condition of the reflectivity of the partially reflective surface 8. The reflectivity R of the partially reflective surface 8 has a tradeoff relationship in which because the amount of light projected to the user increases as reflectivity is higher, the light use efficiency of the light guide plate is increased, but the see-through characteristics is degraded. Typically, the reflectivity of 30% or lower is desirable in terms of the see-through characteristics.

The reflectivity R of the partially reflective surface 8 preferably exhibits a lower independence of wavelength in the wavelength region of visible light. For example, if a ratio of maximum reflectivity to minimum reflectivity in the visible light region is 50% or higher, the user does not perceive much of the nonuniformity between the image and the outside world. And, if the ratio is 80% or higher, the user becomes hardly perceive the nonuniformity between the image and the outside world. As a result, the color uniformity of the outside world and the color uniformity of the image perceived by the user can be ensured.

It is noted that the partially reflective surface 8 may be realized by use of a metallic film or use of a dielectric multilayer film. Alternatively, a polarizing beam splitter may be used which relies on the polarization of image light to split the light.

The following is a description of the range of reflectivity of the partially reflective surface 8. As described in FIG. 3, it is assumed that the length in the x direction of the region of the light guide plate in which the partially reflective surfaces are placed is S. It is also assumed that the distance from the user's pupils 51 to the first internal reflective surface 6 (eye relief) is ER, that the eye box in the x direction is EB, and that the full angle of field of view in the x direction of the displayed image is FOV (Field of View). In order to allow the user to recognize visually the entire image, the distance S should have a length equal to or greater than the visibility width W as shown in FIG. 3. Thus, the following relationship must be established:

$$S \geq W = EB + 2 \times ER \times \tan(FOV/2) \quad (17)$$

There is a lower limit of manufacturable inter-surface spacing L of the partially reflective surfaces in FIG. 4B. Where the lower limit of the inter-surface spacing is a minimum inter-surface spacing a, the minimum inter-surface spacing is typically the order of 0.2 mm. Even in high reflectivity, the uniformization can be achieved by decreasing the inter-surface spacing. However, as described above, there is a lower limit of manufacturable inter-surface spacing of the partially reflective surfaces, and therefore there is a limit on available reflectivity in the minimum inter-surface spacing a.

Consider the instance where the partially reflective surfaces are arranged in $L_{n+}=(1-R))\times L_n$, such that the image light to be projected is most uniformed. At this time, the smallest inter-surface spacing is $L_{N-1}$ farthest away from the incident surface 5, which is expressed by:

$$L_{N-1}=L_1(1-R))^{(N-2)} \quad (18)$$

At this time width $H_{N-1}$ is expressed by:

$$H_{N-1}L_{N-1}/\sin\theta=H_1(1-R))^{(N-2)} \quad (19)$$

In terms of manufacturing, $L_{N-1}$ should be equal to or greater than the minimum inter-surface spacing a, so that the following is required:

$$a \leq L_{N-1}=L_1(1-R)^{(N-2)} \quad (20)$$

Assuming $A=a/\sin\theta$, Expression (20) is expressed under the condition of width $H_{N-1}$, as follows:

$$A=a/\sin\theta \leq H_{N-1}=H_1(1-R)^{(N-2)} \quad (21)$$

Also, distance S can be expressed as follows:

$$S=H_1+H_2+\ldots+H_{N-1}=H_1/R\times(1-(1-R)^{(N-1)}) \quad (22)$$

From expressions (21) and (22), the condition of available reflectivity R can be determined as:

$$R \leq (H_1-A)/(S-A) \quad (23)$$

The physical sense of expression (23) is considered. If there is no lower limit of manufacturable inter-surface spacing of the partially reflective surfaces, when A=0, an upper limit of reflectivity is $H_1/S$. Thus, the upper limit of available reflectivity depends on a proportion of the width $H_1$ of a single partially reflective surface to the overall width S in which the partially reflective surfaces are arranged. If there is a lower limit of the manufacturable inter-surface spacing of the partially reflective surfaces, the larger the minimum inter-surface spacing a is, that is, the larger A, the lower the upper limit of available reflectivity is.

Also, using $H_1=L_1/\sin\theta$ and expressions (17) and (21), expression (23) takes the form of:

$$R \leq (T\cos\theta-a)/(W\sin\theta-a) \quad (24)$$

As described above, "a" is the minimum inter-surface spacing, T is the thickness of the light guide plate, and angle $\theta$ is an angle formed by the partially reflective surface 8 and the second internal reflective surface 7. Using the eye relief ER, the eye box EB, and the full angle of field of view FOV in the x direction of the displayed image, the visibility width W can be written as $W=EB+2\times ER\times\tan(FOV/2)$.

In order to place the light guide plate in front of the user's eyes, in terms of designability, the thickness T is preferably as thin as possible, and thickness T≤3 mm is required. Also, the minimum inter-surface spacing is the order of a=0.2 mm, and when angle $\theta$=25 degrees, when expression (24) is written under the above limit conditions, using eye relief ER and eye box EB and FOV, $$R \leq 6/(EB+2\times ER\times\tan(FOV/2)) \quad (25)$$

is obtained. It is noted that "a" in the denominator of expression (24) is neglected because it is small as compared with $W\sin\theta$. As shown in expression (25), the larger the eye relief ER, eye box EB and FOV are, the lower the upper limit of available reflectivity of the partially reflective surface is.

When the eye relief ER=20 mm, and the eye box EB=10 mm, if a specific limit of the reflectivity R is determined from expression (25), in the case of 20 degrees ≤FOV<30 degrees, the reflectivity R may be set at 30% or lower; in the case of 30 degrees≤FOV<40 degrees, the reflectivity R may be set at 25% or lower; and in the case of 40 degrees≤FOV<50 degrees, the reflectivity R may be set at 21% or lower.

With the light guide plate 2a according to the embodiment, the range of available reflectivity is extended as compared with the conventional art. For example, in the use in 30 degrees≤FOV<40 degrees, the conventional light guide plate 2' requires reflectivity R≤4%, whereas the range of reflectivity R in the light guide plate in the embodiment is extended to be equal to or less than 25%. As a result, the light use efficiency of the light guide plate improves about 2.9-fold as compared with the conventional light guide plate.

FIG. 6B shows the image-light intensity distribution by the light guide plate 2a according to the embodiment. The simulation conditions of image projection are that: the partially reflective surfaces are arranged such that the spacing of the partially reflective surfaces is expressed using an equal sign in expression (12), i.e., $L_{n+1}=(1-R)L_n$ is achieved; the reflectivity R of the partially reflective surface is equal to 10%; and the diagonal FOV is equal to 40 degrees. FIG. 6C also shows the intensity distribution along the x axis. As compared with the distribution of the conventional light guide plate shown in FIG. 6A, it is seen that the light guide plate according to the embodiment shown in FIG. 6B is improved in intensity distribution, and the brightness distribution of the displayed image can be uniformed.

According to the embodiment as described above, the inter-surface spacings of the partially reflective surfaces are narrower from the incident surface toward the light guide plate end. Thereby, even when high reflectivity is set for the partially reflective surfaces, the projection of image light of uniform brightness is enabled, thus providing a light guide plate capable of projecting image light of uniform brightness with high light use efficiency.

It is noted that applying a coating having chemical properties to the exit surface of the light guide plate can increase the performance of the light guide plate. For example, if an Anti-reflection (AR) coating layer is applied to the outer side of the first internal reflective surface 6, the light use efficiency can be increased and also unwanted stray light can be eliminated. Additionally or alternatively, by applying a light control coating layer having transmittance distribution to the outer side of the first internal reflective surface 6, the intensity distribution of the image light can be further uniformed.

Further, in the above description, the partially reflective surfaces are approximately equal in reflectivity. However, no problem is presented even if the partially reflective surfaces are not equal in reflectivity. For example, the intensity distribution of image light can be further uniformed by making the inter-surface spacings of the partially reflective surfaces different from each other, and also by adjusting the reflectivity of the partially reflective surfaces for each reflective surface.

The following is a description of components within the image display apparatus 1 except the light guide plate 2a.

<About Image Generation Unit 3>

The image generation unit 3 in FIG. 1 includes a light source, an illumination optics, an image generation element generating an image, and a projection optics for projecting image light.

Examples of the light source include an RGB LED, and an RGB LD. As a matter of course, a white LED may be used as a light source. In this case, there is a need for the image generation element to be equipped with a color filter. The illumination optics illuminates uniformly the image generation element with light of the light source. For the image generation element, a liquid crystal device, a digital mirror device (DMD) or the like may be used. The projection optics includes a projection lens including a single lens or multiple lenses, and projects the image light generated by the image generation element. It is noted that, as an image generation element, a self-luminous image generation element such as an organic EL, a μLED, or the like may be used. In this case, the light source and the illumination optics become unnecessary, and a reduction in size and weight of the image generation unit is enabled.

<About Coupling Prism 4>

The coupling prism 4 in FIG. 1 is formed and placed such that the field of view of the image light generated by the image generation unit 3 and the field of view of the image displayed by the image display apparatus 1 are approximately identical. For example, the coupling prism 4 is formed and placed such that the light which is vertically incident onto the first surface 41 of the coupling prism 4 exits approximately vertically from the first internal reflective surface 6. Specifically, for example, it is assumed that the first surface 41 through which the light from the image generation unit 3 enters the coupling prism 4 forms approximately an angle 2 θ with the second internal reflective surface 7. Stated another way, the coupling prism 4 is formed and placed such that the angle formed by the first surface 41 and the second internal reflective surface 7 is approximately twice the angle θ formed by the partially reflective surface 8 and the second internal reflective surface 7. More specifically, the coupling prism 4 is formed and placed such that the vertex angle α of the coupling prism 4 is approximately equal to the angle θ, and the second surface 42 through which the image light exits from the coupling prism 4, and the incident surface 5 are approximately parallel to each other.

Also, the coupling prism 4 and the light guide plate 2a may be formed of the same medium or media approximately equal in refractive index. Thereby, the entry angle of the light entering the coupling prism 4 and the exit angle of the light exiting from the first internal reflective surface 6 can be made approximately equal to each other. Therefore, the field of view of the image light generated by the image generation unit 3 and the field of view of the image displayed by the image display apparatus 1 can be made approximately identical with each other.

Further, the image generation unit 3 and the coupling prism 4 are arranged such that the principal light beam at the center of the field of view of the image light emitted from the image generation unit 3 enters the coupling prism 4 approximately vertically. Thereby, the principal light beam at the center of the field of view of the image light emitted from the image generation unit 3 can exits approximately vertically from the first internal reflective surface 6.

It is noted that the principal light beam at the center of the field of view of the image light emitted from the image generation unit 3 may be configured to exit, at an angle other than the right angle, from the first internal reflective surface 6 of the light guide plate 2a. This can be achieved by configuring, for example, to allow the principal light beam at the center of the field of view of the image light emitted from the image generation unit 3 to enter, at an angle other than the right angle, the coupling prism 4.

Also, the coupling prism 4 may have a vertex angle α different from the angle θ. In this case, by the effect of beam compression or beam expansion, the field of view of the image light emitted from the image generation unit 3 and the field of view of the image displayed by the image display apparatus 1 can be made different from each other.

The function of enlarging the pupil in the z direction may be imparted to the coupling prism 4. By doing so, the eye box can be expanded in the z direction.

Further, the coupling prism 4 may be omitted, and the outgoing light from the image generation unit 3 may be input directly to the incident surface 5 of the light guide plate 2a. Thereby, a reduction in component count of the image display apparatus 1 is enabled, and in turn a cost reduction, a mass reduction and a size reduction are enabled.

<Example Application of Image Display Apparatus 1>

Figure 7A:
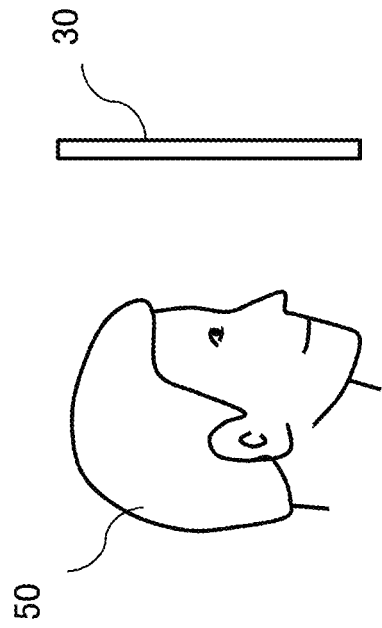
FIGS. 7A and 7B are diagrams illustrating example applications of the image display apparatus 1.
Figure 7B:

FIGS. 7A and 7B are diagrams illustrating example applications of the image display apparatus 1. FIG. 7A shows an example of applying the image display apparatus 1 to a head-mounted display 20. The head-mounted display 20 is worn, for example, on the head of a user 50, and the light guide plate 2a (FIG. 1) is placed around a line of sight of the user 50. Also, the incident surface 5 (FIG. 1) of the light guide plate 2a may be placed in the lateral direction of the eye of the user 50 or placed in the vertical direction of the user's pupil 51. The user 50 can visually recognize the image displayed by the head-mounted display 20 as, for example, a virtual image.

FIG. 7B shows an example of applying the image display apparatus 1 to a head-up display 30. For example, the head-up display 30 is stationarily placed in a predetermined position. When the user 50 moves closer to the head-up display 30, the user 50 can visually recognize the image displayed on the head-up display 30 as, for example, a virtual image. The head-up display 30 can be suitably used, for example, in a driver assist function of a vehicle, a digital signage, and the like.

The following is a description of an example application to the head-mounted display 20 as illustrated in FIG. 7A.

Figure 8A:
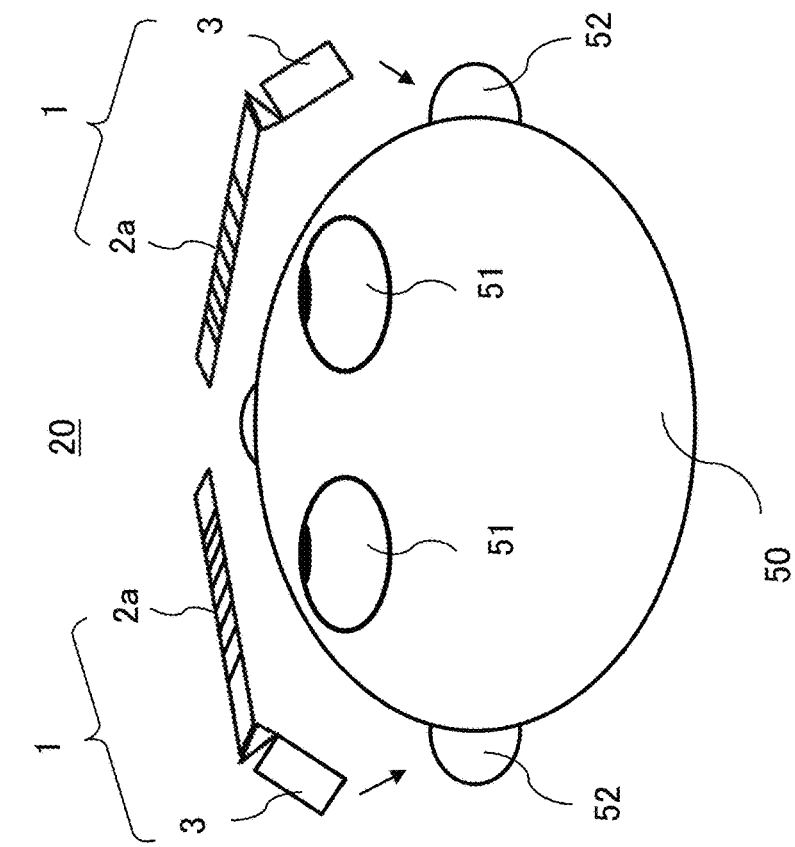
FIGS. 8A and 8B are diagrams illustrating a user 50 wearing a head mounted display 20.
Figure 8B:
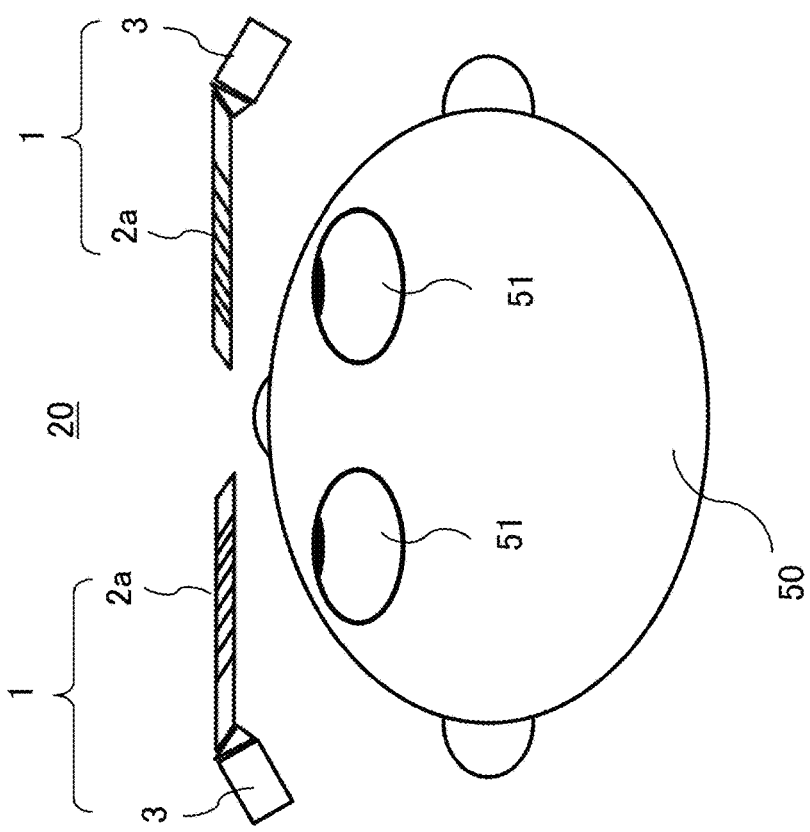

FIGS. 8A and 8B are diagrams illustrating the user 50 wearing the head mounted display 20 when seen from above the head of the user 50. FIG. 8A shows the light guide plate 2a placed parallel to the user's pupil 51. FIG. 8B shows the light guide plate 2a placed in an inclined position with respect to the user's pupil 51. Where the light guide plate 2a is placed in an inclined position with respect to the user's pupil 51 as illustrated in FIG. 8B, the image generation unit 3 can be placed closer to an ear 52 of the user 50, and thus a highly compactable and highly designable head-mounted display 20 can be provided. It is noted that FIGS. 8A and 8B shows the image display apparatus 1 being placed for each eye of the user 50, but even when the image display apparatus 1 is placed in front of only one of the left and right eyes, the same effects are produced.

Figure 9:
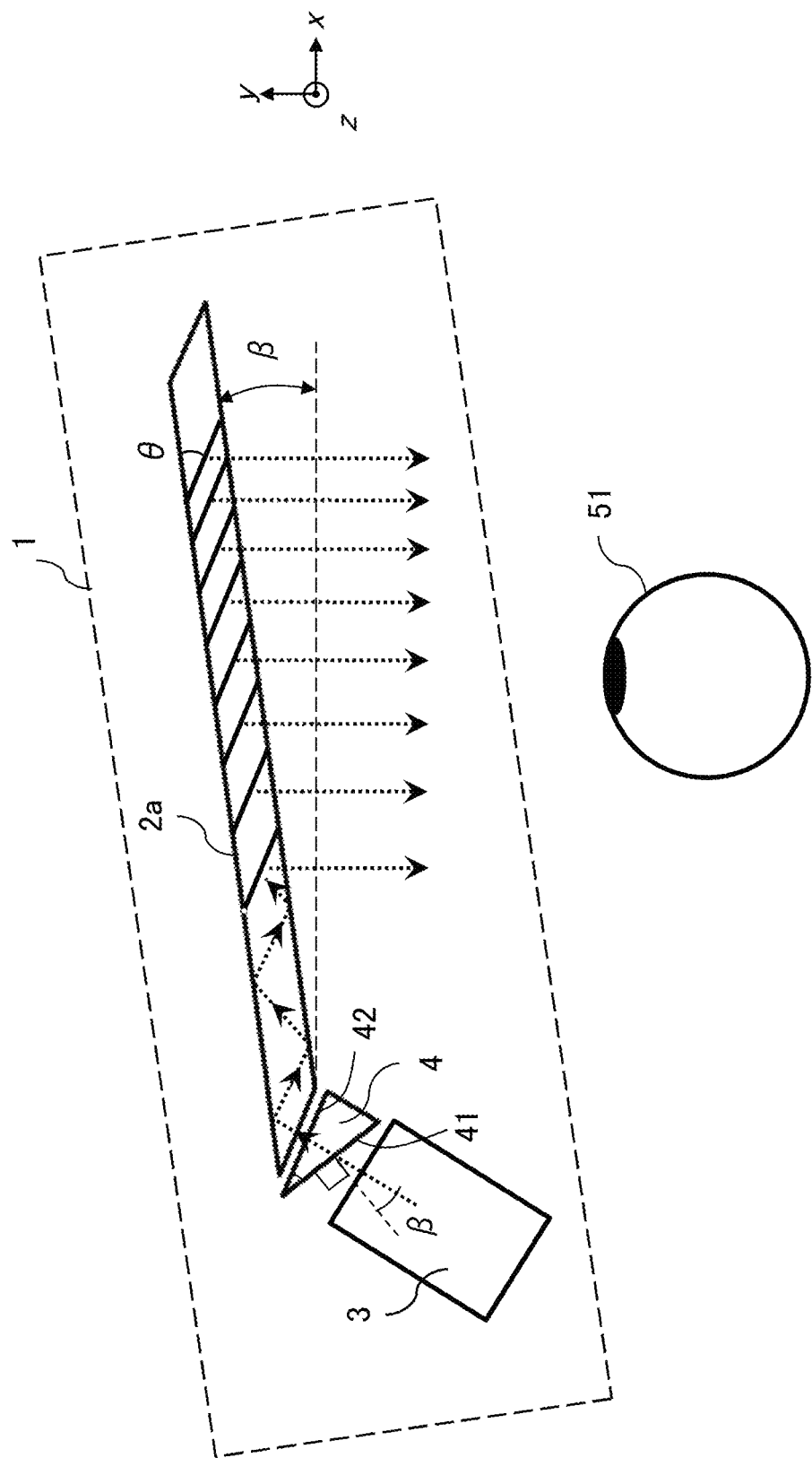
FIG. 9 is an enlarged diagram of the light guide plate 2a placed in an inclined position.

FIG. 9 is an enlarged diagram of the light guide plate 2a placed an inclined position as illustrated in FIG. 8A. In this case, the light guide plate 2a is placed at an inclination angle β with respect to the user's pupil 51 (i.e., in the x-axis direction). Because the field of view of the image light used is offset by the angle β, the image generation unit 3 is structured to be also inclined by the angle β from the first surface 41 of the coupling prism 4 to allow light to enter the coupling prism 4.

In this manner, where the image display apparatus 1 is applied to a head-mounted display, placing the light guide plate 2a in an inclined position with respect to the user's pupil 51 enables providing a head-mounted display with a better fit to the head and with higher designability.

<About Functional Configuration of Head-Mounted Display 20>

Figure 10:
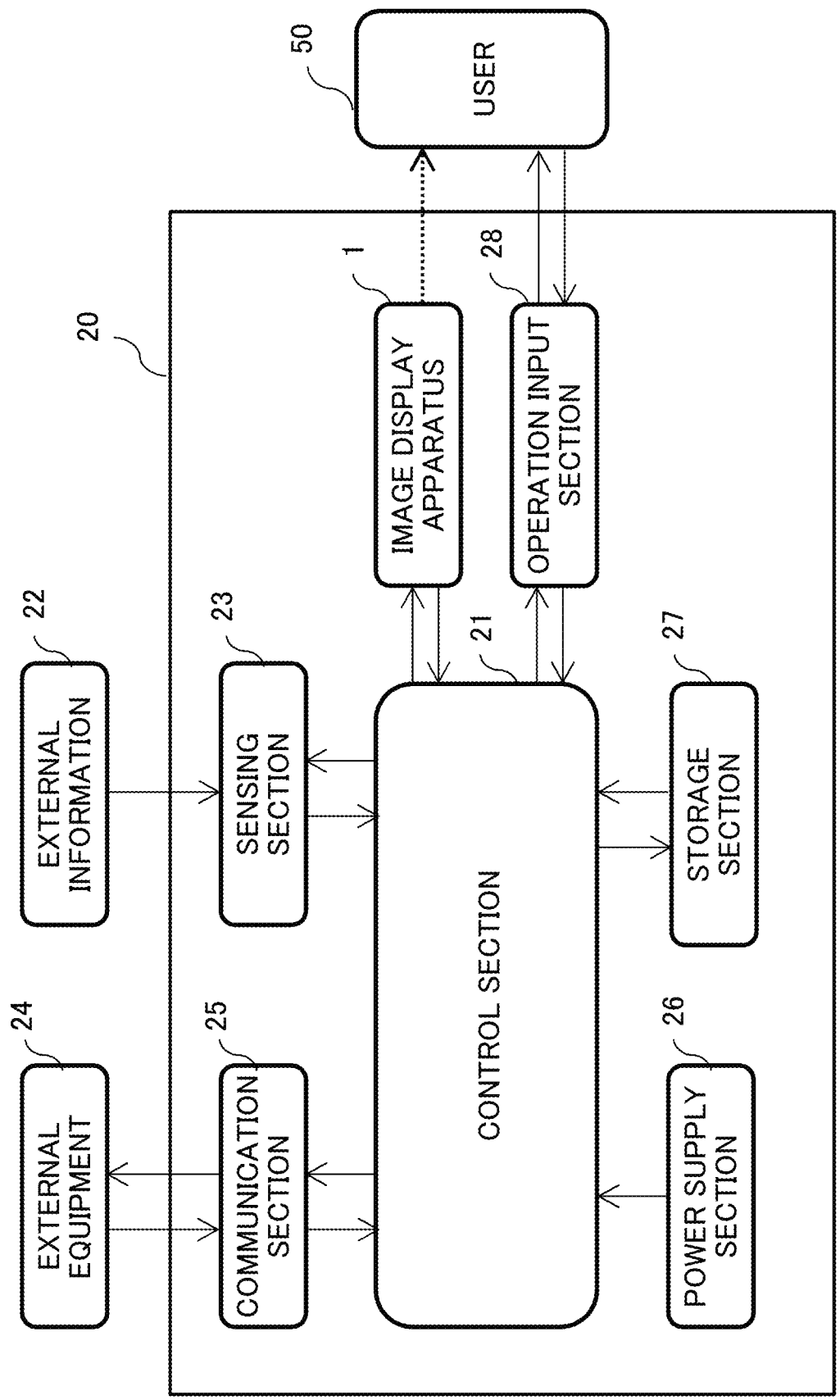
FIG. 10 is a block diagram illustrating the functional configuration of the head mounted display 20.

FIG. 10 is a block diagram illustrating the functional configuration of the head mounted display 20 which includes, in addition to the image display apparatus 1, a control section 21 that controls the overall head-mounted display 20, a sensing section 23 that detects external information 22, a communication section 25 that communicates with external equipment 24, a power supply section 26 that supplies the power, a storage section 27 that storing information, an operation input section 28 and the like. It is noted that FIG. 10 shows only control lines and information lines which are considered necessary for description, and all the control lines and information lines are not necessarily shown.

The external information 22 includes, for example, the conditions (position, orientation, motion) of the user 50, the conditions of outside (brightness, sound, spatial information), and the like. Examples of the sensing section 23 detecting the conditions (position, orientation, motion) of the user 50 include a tilt sensor, an acceleration sensor, a GPS sensor and the like. Examples of the sensing section 23 detecting the conditions of outside (brightness, sound, spatial information) include an illuminance sensor, a sound sensor, an infrared sensor (imaging device).

The communication section 25 is a device communicating with the external equipment 24 such as information on the internet, a smart phone, a tablet, PC and the like. For example, Bluetooth (Registered Trademark), Wifi (Registered Trademark), and the like may be used for the communication section 25.

The operation input section 28 receives the operation of the user 50 to operate the head-mounted display 20. Specifically, for example, speech recognition using a sound sensor, touch-panel input using a pressure-sensitive sensor or a capacitance sensor, gestures input using an infrared sensor, and the like may be used for the operation input section 28.

Second Embodiment

A second embodiment includes a modification to the light guide plate 2a in the first embodiment, and in this configuration, the partially reflective surface array is divided into a plurality of regions (hereinafter referred to as "segments") along in the arrangement direction of the partially reflective surfaces, and the inter-surface spacing of the partially reflective surfaces is varied on a segment-by-segment basis.

Figure 11A:
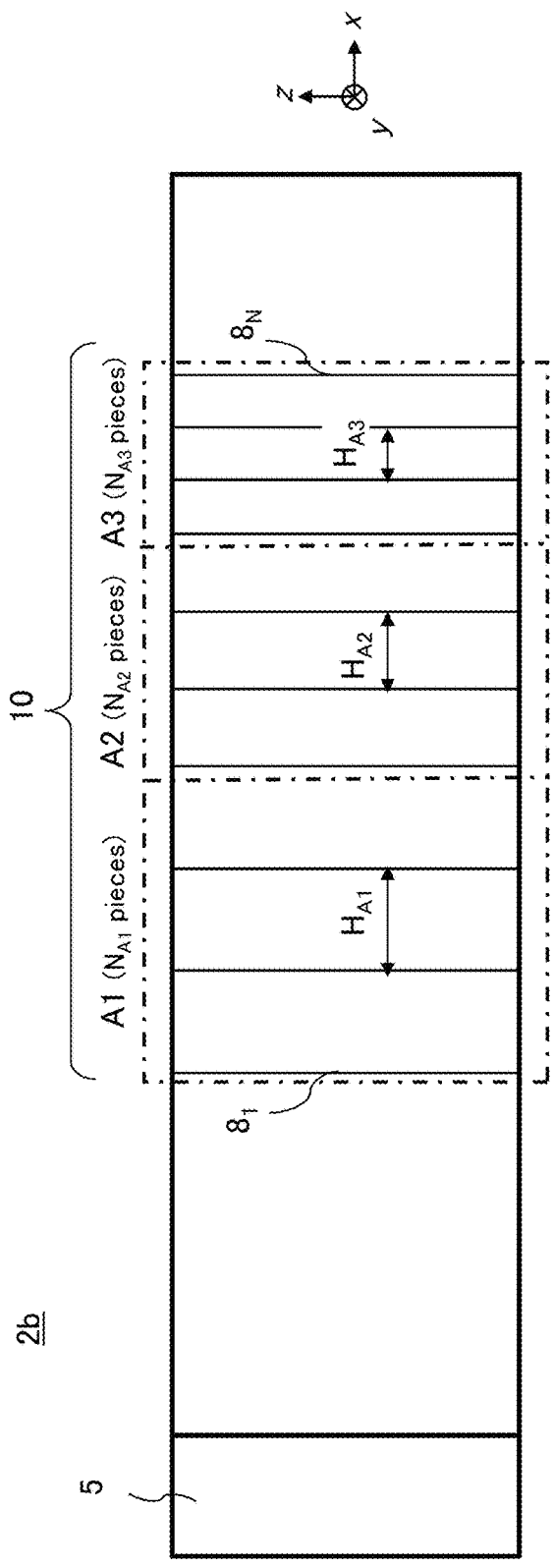
FIGS. 11A and 11B are diagrams illustrating the configuration of a light guide plate 2b according to a second embodiment.
Figure 11B:
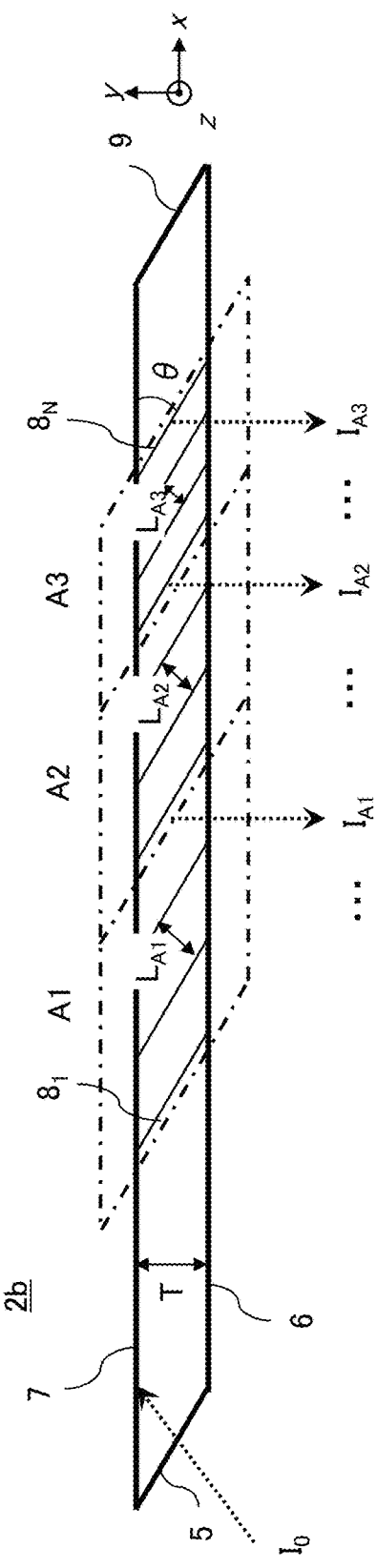

FIGS. 11A and 11B are diagrams illustrating the configuration of a light guide plate 2b according to the second embodiment, in which FIG. 11A is a front view and FIG. 11B is a plan view. The light guide plate 2b includes the first internal reflective surface 6 and the second internal reflective surface 7 which are approximately parallel to each other. The light guide plate 2b has the partially reflective surface array 10 therein, the partially reflective surface array 10 including the number N of partially reflective surfaces $8_1$ to $8_N$. Here, the partially reflective surfaces 8 are approximately equal in reflectivity to each other.

The partially reflective surface array 10 is divided into a plurality (three in the embodiment) of segments A1 to A3 (indicated by a dot-and-dash line) along the arrangement direction of the partially reflective surfaces 8. The partially reflective surfaces 8 within the same segment are approximately equal in inter-surface spacing L. Between adjacent segments, the partially reflective surfaces 8 are arranged in such that the inter-surface spacing L in one segment located closer to the light guide plate end 9 is smaller than that in the other. Therefore, in comparison with the light guide plate 2a described in the first embodiment, the number of types of substrate thickness required for manufacturing is decreased, and thus a light guide plate can be provided at low cost.

The placement of the partially reflective surfaces 8 of the light guide plate 2b is described. When a segment number k is an integer from 1 to 3, then an inter-surface spacing of the partially reflective surfaces 8 belonging to the segment Ak is indicated as $L_{Ak}$, and a width is indicated as $H_{Ak}$. Also, the number of partially reflective surfaces 8 belonging to the segment Ak is assumed as $N_{Ak}$. That is, the number $N_{Ak}$ of partially reflective surfaces 8 within the segment is variable rather than constant. After the light with intensity $I_0$ entering through the incident surface 5 of the light guide plate 2a passes through the segment A1, due to the $N_{A1}$ partially reflective surfaces 8, the intensity decreases from $I_0$ to $I_{A1}=(1-R))^{N_{A1}} \times I_0$. Therefore, in order to uniform the image light to be projected, an inter-surface spacing $L_{A2}$ of the partially reflective surfaces 8 in the segment A2 is required to be smaller than the inter-surface spacing $L_{A1}$ to increase the luminous flux density. Hence, the relationship is $L_{A2}<L_{A1}$.

Next, the lower limit of the inter-surface spacing $L_{A2}$ is determined. In the segment A2, for projection of the image light at intensity equivalent to that in the segment A1, the inter-surface spacing $L_{A2}$ is required only to be decreased by $(1-R))^{N_{A1}}$ corresponding to a decrease in light intensity, i.e., to be $L_{A2}=L_{A1}(1-R))^{N_{A1}}$. If the inter-surface spacing $L_{A2}$ is smaller than $L_{A1}(1-R))^{N_{A1}}$, the number of partially reflective surface is increase due to a too small inter-surface spacing, leading to an increase in manufacturing costs. Hence, the inter-surface spacing $L_{A2}$ is within the following range.

$$L_{A1} \times (1-R)^{N_{A1}} \leq L_{A2} < L_{A1} \qquad (26)$$

Similarly, the inter-surface spacing $L_{A3}$ is within the following range.

$$L_{A2} \times (1-R)^{N_{A2}} \leq L_{A3} < L_{A2} \qquad (27)$$

Here, the example of division into three segments A1 to A3 has been described, but the number of segments may be two or may be more than three.

For example, the case of the number of segments being M is described (M is an integer of 2 or greater). It is assumed that a k-th segment from the incident surface 5 of the light guide plate 2b is Ak, that the number of partially reflective surfaces 8 existing in the segment Ak is $N_{Ak}$, and that the inter-surface spacing is $L_{Ak}$ (k is an integer from 1 to M). In this case, for the same reason as the above, the inter-surface spacings $L_{Ak}$, $L_{Ak+1}$ of the partially reflective surfaces 8 for projection of uniform image light is required to satisfy the following relationship:

$$L_{Ak} \times (1-R)^{N_{Ak}} \leq L_{Ak+1} < L_{Ak} (1 \leq k \leq M-1) \qquad (28)$$

As in the case of the first embodiment, for prevention of a partial loss of the image, assuming that the thickness of the light guide plate is T and the angle formed by the partially reflective surface 8 and that the second internal reflective surface 7 is θ, the largest inter-surface spacing Lm is set to satisfy the following:

$$L_{A1} \geq T \times \cos\theta \quad (29)$$

Also, as in the case of the first embodiment, in terms of costs, the largest inter-surface spacing $L_{A1}$ is set to satisfy the following:

$$L_{A1} \geq T \times \cos\theta/2 \quad (30)$$

The limit of reflectivity R may be determined as in the case of the first embodiment, which can be expressed by:

$$R \leq 6/(EB+2\times ER \times \tan(FOV/2)) \quad (31)$$

When the eye relief ER=20 mm and the eye box EB=10 mm, if the limit of the reflectivity R is determined from expression (31), in the case of 20 degrees≤FOV<30 degrees, the reflectivity R may be set at 30% or lower; in the case of 30 degrees≤FOV<40 degrees, the reflectivity R may be set at 25% or lower; and in the case of 40 degrees≤FOV<50 degrees, the reflectivity R may be set at 21% or lower.

In the embodiment, the range of available reflectivity is also extended as compared with the conventional light guide plate. For example, in the use in 30 degrees≤FOV<40 degrees, the conventional light guide plate requires reflectivity R 4%, whereas the range of reflectivity R in the light guide plate in the embodiment is extended to be equal to or less than 25%. As a result, the light use efficiency of the light guide plate improves about 2.9-fold as compared with the conventional light guide plate.

As described above, in the second embodiment, the partially reflective surface array 10 of the light guide plate 2b is divided into a plurality of segments along the arrangement direction of the partially reflective surfaces 8. The partially reflective surfaces in the same segment are approximately equal in inter-surface spacing, and the inter-surface spacing of partially reflective surfaces is different between adjacent segments. And, the closer to the light guide plate end 9 the segment is located, the smaller the inter-surface spacing is. As a result, even if high reflectivity is set for the partially reflective surfaces, the image light of uniform brightness can be projected, and in turn a light guide plate capable of projecting image light of uniform brightness with high light use efficiency can be provided.

Third Embodiment

In a third embodiment, the uniforming element is configured to vary reflectivity among partially reflective surfaces within the light guide plate.

Figure 12A:
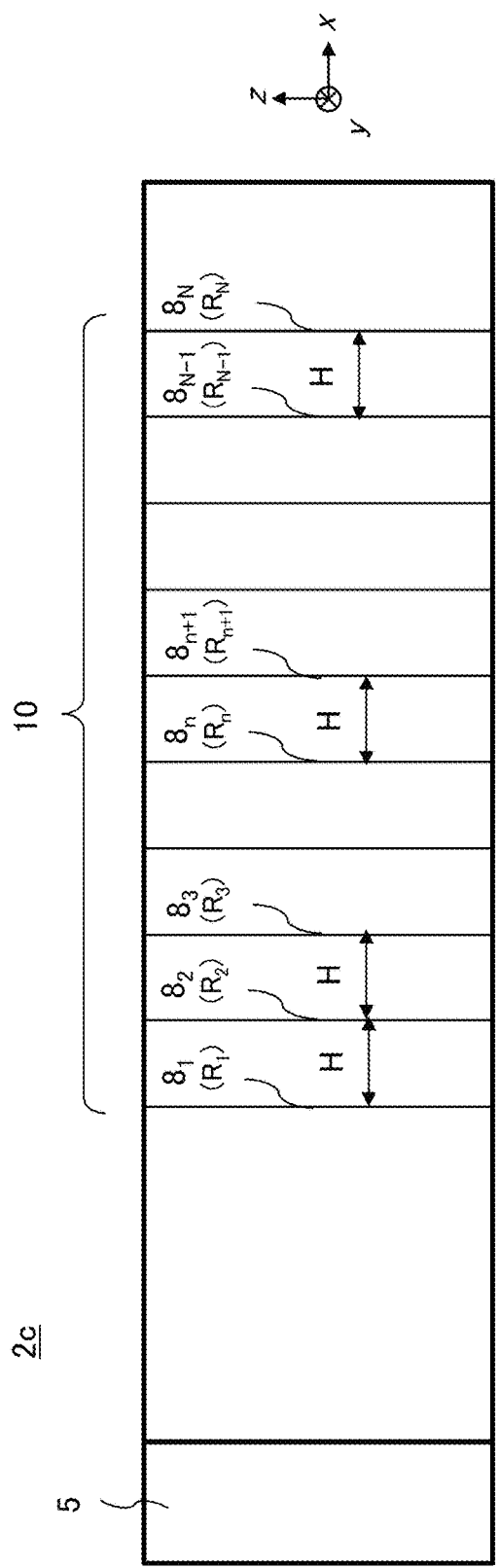
FIGS. 12A and 12B are diagrams illustrating the configuration of a light guide plate 2c according to a third embodiment.
Figure 12B:
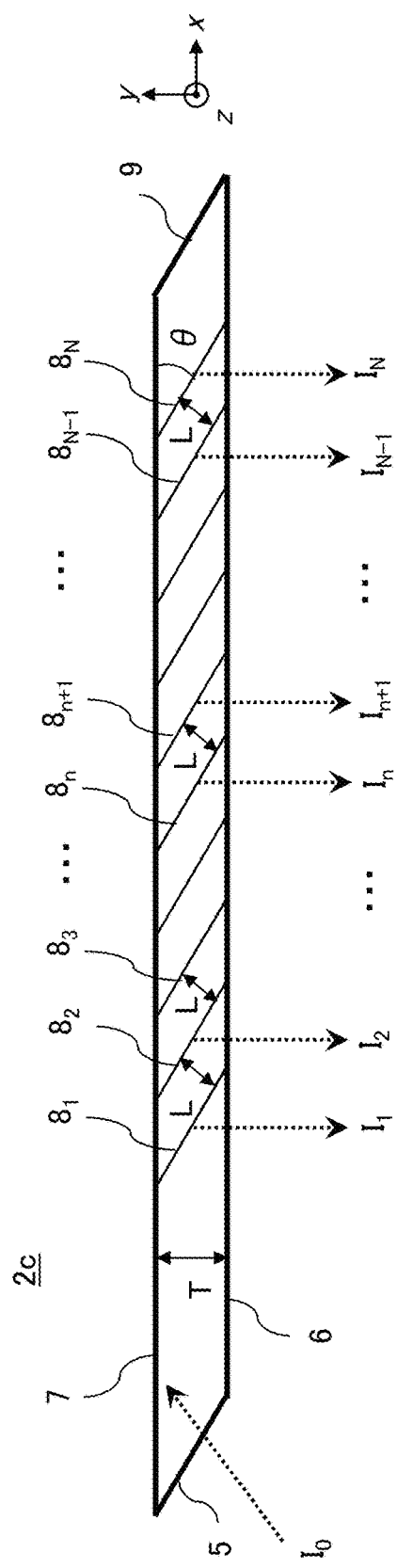

FIGS. 12A and 12B are diagrams illustrating the configuration of a light guide plate 2c according to the third embodiment, in which FIG. 12A is a front view and FIG. 12B is a plan view. The light guide plate 2c includes the first internal reflective surface 6 and the second internal reflective surface 7 which are approximately parallel to each other. The light guide plate 2c has the partially reflective surface array 10 therein, the partially reflective surface array 10 including the number N of partially reflective surfaces 8. In this configuration, the number N of partially reflective surfaces 8 are approximately equal in inter-surface spacing L, and the reflectivity R differs among the partially reflective surfaces 8.

The configuration of the partially reflective surfaces of the light guide plate 22c is described. The N partially reflective surfaces 8 are individually denoted as $8_n$ in order from the incident surface 5 (n is an integer from 1 to N). It is assumed that reflectivity of each partially reflective surface $8_n$ is $R_n$ and that the inter-surface spacing of the partially reflective surfaces 8 is L. The partially reflective surfaces 8 increase in reflectivity R from the incident surface 5 toward the light guide plate end 9 in order to uniform the intensity distribution of the image light projected by the light guide plate 2.

Next, desirable reflectivity R of the partially reflective surface 8 is described. It is assumed that, when the image light of light intensity $I_0$ enters through the light-guide-plate incident surface 5, light intensity of the light reflected off the partially reflective surface $8_n$ is $I_n$. At this time, $I_n$ can be expressed by the following:

$$I_n = (1-R_1)(1-R_2)\ldots(1-R_{n-1})R_n I_0 \quad (32)$$

The relationship between reflectivity $R_{n+1}$ and reflectivity $R_n$ of the adjacent partially reflective surfaces is determined. The amount of light propagating through the light guide plate decreases as the light is propagated deeper into the light guide plate by the partially reflective surfaces. Therefore, for projection of the image light of uniform brightness, the partially reflective surfaces are required to increase in reflectivity from the incident surface 5 toward the light guide plate end 9. Hence, the relationship $R_n < R_{n+1}$ is established.

Then, the upper limit of $R_{n+1}$ is determined. If the (n+1)-th light intensity $I_{n+1}$ and the n-th light intensity $I_n$ are equal, uniform image light can be projected. If $I_{n+1} = I_n$ is rewritten as the relationship of reflectivity using expression (32), $R_{n+1} = R_n/(1-R_n)$ is obtained. Hence, the reflectivity R is required to be within the range of:

$$R_n < R_{n+1} \leq R_n/(1-R_n) (1 \leq n \leq N-1) \quad (33)$$

In terms of the see-through characteristics, the first $R_1$ is desirably set such that the highest reflectivity $R_N$ becomes 30% or lower.

As in the case of the first embodiment, for prevention of a partial loss of the image, the inter-surface spacing L of the partially reflective surfaces 8 is desirably set as:

$$L \leq T \times \cos\theta \quad (34)$$

and, in terms of costs, it is desirably set as:

$$L \geq T \times \cos\theta/2 \quad (35)$$

Next, for the most uniform image light to be projected, i.e., for $R_{n+1} = R_n/(1-R_n)$, the limit of available reflectivity is determined. The highest reflectivity in the light guide plate 2c is reflectivity $R_N$ of the partially reflective surface $8_N$ located closest to the light guide plate end 9, and recurrence formula $R_{n+1} = R_n/(1-R_n)$ is solved to obtain $R_N = R_1/(1-(N-1)R_1)$. In order to set reflectivity $R_N$ at 30% or lower, $$R_1/(1-(N-1)R_1) < 0.3 \quad (36)$$

is required to be satisfied.

Also, using the length S in the x direction of the region of the light guide plate in which the partially reflective surfaces are arranged, the spacing L of the partially reflective surfaces, and the angle θ formed by the partially reflective surface 8 and the second internal reflective surface 7, the number N of partially reflective surfaces can be written as N=S×sin θ/L. Hence, expression (36) is written as:

$$R_1 < 0.3/(1+0.3 \times S \times \sin\theta/L) \quad (37)$$

Using expressions (17) and (34), the above expression (37) can be expressed as:

$$R_1 < 0.3/(1+0.3 \times W \times \sin\theta/T) \quad (38)$$

As described earlier, T is the thickness of the light guide plate, the angle θ is the angle formed by the partially reflective surface 8 and the second internal reflective surface 7, and W is the visibility width. Using eye relief ER and eye box EB, and FOV, W=EB+2×ER×tan(FOV/2) can be written.

In order to place the light guide plate in front of the user's eye, in terms of designability, the thickness T is preferably as thin as possibly, and thickness T≤3 mm is required. Also, when angle θ=25 degrees, if expression (38) is written under the limit T≤3 mm, using eye relief ER and eye box EB and FOV, $$R_1 < 6.4/(EB+2\times ER\times \tan(FOV/2)+21) \quad (39)$$

is written.

When the eye relief ER=20 mm, and the eye box EB=10 mm, if a specific limit of the reflectivity $R_1$ is determined from expression (39), in the case of 20 degrees≤FOV<30 degrees, reflectivity $R_1$ may be set at 15% or lower; in the case of 30 degrees≤FOV<40 degrees, the reflectivity $R_1$ may be set at 14% or lower; and in the case of 40 degrees≤FOV<50 degrees, the reflectivity $R_1$ may be set at 13% or lower.

In the embodiment, the range of available reflectivity is also extended as compared with the conventional light guide plate. For example, in the use in 30 degrees≤FOV<40 degrees, the conventional light guide plate requires reflectivity R≤4%, whereas in the light guide plate in the embodiment, the reflectivity $R_1$ of the partially reflective surface having the lowest reflectivity is available up to 14%. As a result, the light use efficiency of the light guide plate improves about 2.8-fold as compared with the conventional light guide plate.

As described above, in the configuration in the third embodiment, the partially reflective surfaces 8 within the light guide plate 2c varies in reflectivity in such a manner as to increase in reflectivity from the incident surface 5 toward the light guide plate end 9. As a result, even if high reflectivity is set for the partially reflective surfaces, the image light of uniform brightness can be projected, and in turn a light guide plate capable of projecting image light of uniform brightness with high light use efficiency can be provided.

Fourth Embodiment

A fourth embodiment includes a modification to the light guide plate 2c in the third embodiment, and in this configuration, the partially reflective surface array is divided into a plurality of segments along in the arrangement direction of the partially reflective surfaces, and the reflectivity of the partially reflective surfaces is varied on a segment-by-segment basis.

Figure 13A:
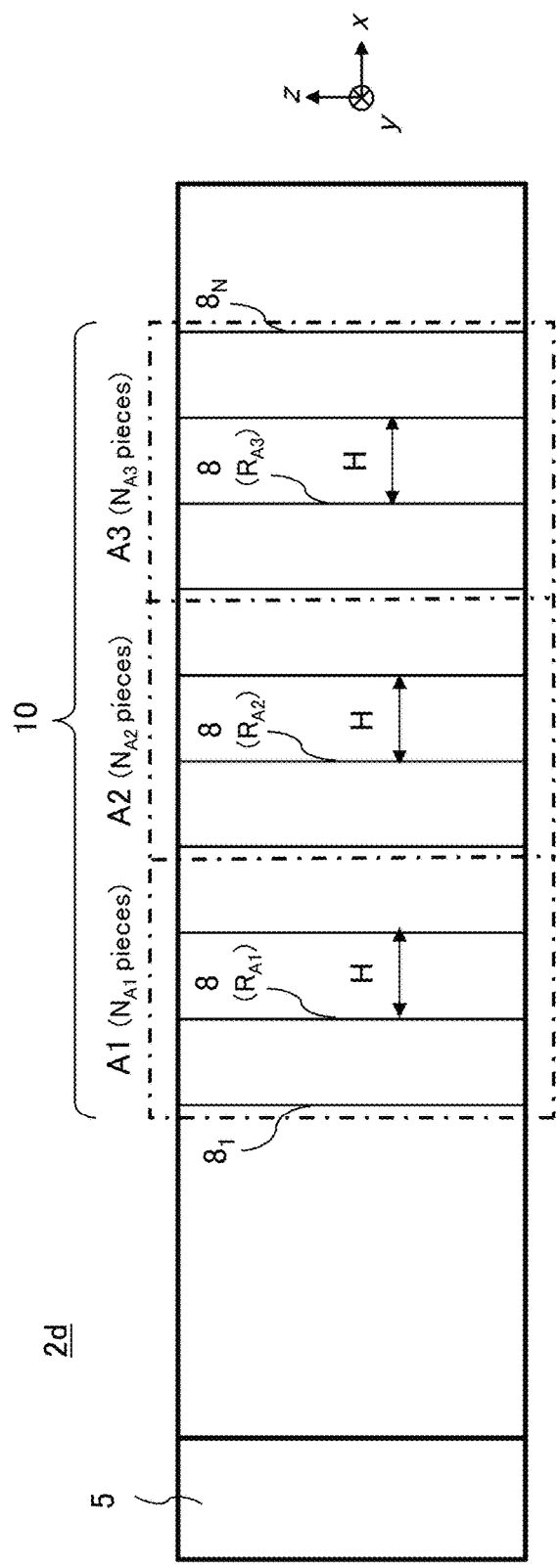
FIGS. 13A and 13B are diagrams illustrating the configuration of a light guide plate 2d according to a fourth embodiment.
Figure 13B:
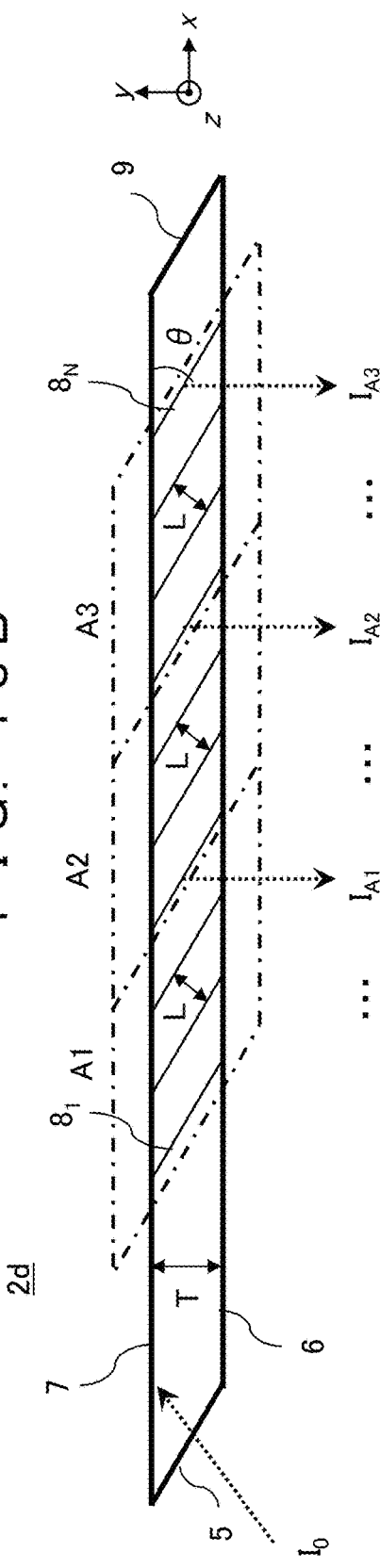

FIGS. 13A and 13B are diagrams illustrating the configuration of a light guide plate 2d according to the fourth embodiment, in which FIG. 13A is a front view and FIG. 13B is a plan view. The light guide plate 2d includes the first internal reflective surface 6 and the second internal reflective surface 7 which are approximately parallel to each other. The light guide plate 2d has the partially reflective surface array 10 therein, the partially reflective surface array 10 including the number N of partially reflective surfaces $8_1$ to $8_N$. Here, the partially reflective surfaces 8 are approximately equal in inter-surface spacing L (width H).

The partially reflective surface array 10 is divided into a plurality (three in the embodiment) of segments A1 to A3 along the arrangement direction of the partially reflective surfaces 8. The partially reflective surfaces 8 within the same segment are approximately equal in reflectivity R. Between adjacent segments, the reflectivity R in one segment located closer to the light guide plate end 9 is set higher than that in the other, in order to uniform the intensity distribution of the image light to be projected. In comparison with the light guide plate 2c in the third embodiment, the number of types of coatings for the partially reflective surfaces 8 required for manufacturing is decreased, and thus a light guide plate can be provided at low cost.

Next, a desirable range of reflectivity R of the partially reflective surfaces 8 is described. When a segment number k is an integer from 1 to 3, reflectivity of the partially reflective surfaces 8 belonging to the segment Ak is indicated as $R_{Ak}$. Also, the number of partially reflective surfaces 8 belonging to the segment Ak is assumed as $N_{Ak}$.

After the light with intensity $I_0$ entering through the incident surface 5 of the light guide plate 2d passes through the segment A1, due to the $N_{A1}$ partially reflective surfaces 8, the intensity decreases from $I_0$ to $I_{A1}=(1-R_{A1})^{N_{A1}}\times I_0$. Therefore, in order to uniform the image light to be projected, reflectivity $R_{A2}$ of the partially reflective surfaces 8 in the segment A2 is required to be higher than the reflectivity $R_{A1}$ to increase the luminous flux density. Hence, the relationship is $R_{A2}>R_{A1}$.

Next, the upper limit of the reflectivity $R_{A2}$ is determined. In the segment A2, for projection of the image light at intensity equivalent to that in the segment A1, the reflectivity $R_{A2}$ is required only to be increased by the inverse of a decrease in light intensity, i.e., to be $R_{A2}=R_{A1}/(1-R_{A1})^{N_{A1}}$. Hence, a desire range of the reflectivity $R_{A2}$ is:

$$R_{A1} < R_{A2} \le R_{A1}/(1-R_{A1})^{N_{A1}} \quad (40)$$

Similarly, a desirable range of the reflectivity $R_{A3}$ is:

$$R_{A2} < R_{A3} \le R_{A2}/(1-R_{A2})^{N_{A2}} \quad (41)$$

Here, the example of division into three segments A1 to A3 has been described, but the number of segments may be two or may be more than three.

For example, the case of the number of segments being M is described (M is an integer of 2 or greater). It is assumed that a k-th segment from the incident surface 5 of the light guide plate 2b is Ak, that the number of partially reflective surfaces 8 existing in the segment Ak is $N_{Ak}$, and that the reflectivity is $R_{Ak}$ (k is an integer from 1 to M). In this case, for the same reason as the above, the reflectivity $R_{Ak}$, $R_{Ak+1}$ of the partially reflective surfaces 8 for projection of uniform image light is required to satisfy the following relationship:

$$R_{Ak} < R_{Ak+1} \le R_{Ak}/(1-R_{Ak})^{N_{Ak}} \quad (1 \le k \le M-1) \quad (42)$$

As in the third embodiment, an available range of the reflectivity $R_{A1}$ of the partially reflective surface having the lowest reflectivity is given by:

$$R_{A1} < 6.4/(EB+2\times ER\times \tan(FOV/2)+21) \quad (43)$$

When the eye relief ER=20 mm, and the eye box EB=10 mm, if a specific limit of the reflectivity $R_1$ is determined from expression (43), in the case of 20 degrees≤FOV<30 degrees, the reflectivity $R_{A1}$ may be set at 15% or lower; in the case of 30 degrees≤FOV<40 degrees, the reflectivity RA1 may be set at 14% or lower; and in the case of 40 degrees≤FOV<50 degrees, reflectivity $R_{A1}$ may be set at 13% or lower.

In the embodiment, the range of available reflectivity is also extended as compared with the conventional light guide plate. For example, in the use in 30 degrees≤FOV<40 degrees, the conventional light guide plate requires reflectivity R≤4%, whereas in the light guide plate in the embodiment, the reflectivity $R_{A1}$ of the partially reflective surface having the lowest reflectivity is available up to 14%. As a result, the light use efficiency of the light guide plate improves about 2.8-fold as compared with the conventional light guide plate.

As described above, in the fourth embodiment, the partially reflective surface array 10 of the light guide plate 2d is divided into a plurality of segments along the arrangement direction of the partially reflective surfaces 8. The partially reflective surfaces in the same segment are approximately equal in reflectivity, and the reflectivity of the partially reflective surface is different between adjacent segments. The closer to the light guide plate end 9 the segment is located, the higher the reflectivity is. As a result, even if high reflectivity is set for the partially reflective surfaces, the image light of uniform brightness can be projected, and in turn a light guide plate capable of projecting image light of uniform brightness with high light use efficiency can be provided.

Fifth Embodiment

In a fifth embodiment, the uniforming element is configured to apply a light control coating layer having transmittance distribution to the outer side of the first internal reflective surface 6 within the light guide plate.

FIGS. 14A and 14B are diagrams illustrating the configuration of a light guide plate 2e according to the fifth embodiment, in which FIG. 14A is a front view and FIG. 14B is a plan view. The light guide plate 2e includes the first internal reflective surface 6 and the second internal reflective surface 7 which are approximately parallel to each other. The light guide plate 2e has the partially reflective surface array 10 therein, the partially reflective surface array 10 including the number N of partially reflective surfaces 8. The number N of partially reflective surfaces 8 are all equal in inter-surface spacing L, and also are approximately equal in reflectivity R. Further, a light control coating layer 12 for uniformization of image brightness is applied to the outer side of the first internal reflective surface 6 for projection of the image light to the user. The region in which the light control coating layer 12 is applied includes the range in which at least image light is reflected off the partially reflective surfaces 8 to pass through the first internal reflective surface 6.

The intensity of light to be reflected off the partially reflective surfaces 8 to exit from the light guide plate 2e decreases as the light travels from the light guide plate incident surface 5 toward the light guide plate end 9. Therefore, the transmittance distribution of the light control coating layer 12 is set such that the transmittance increases from the light guide plate incident surface 5 toward the light guide plate end 9 in order to uniform the brightness of the image to be emitted.

Here, the range for forming the light control coating layer 12 is only a range D0 to D1 (distance B) in which, as illustrated in FIG. 14B, the image light is reflected off the partially reflective surfaces 8 to pass through the first internal reflective surface 6. In order to uniform the intensity $I_1$ to $I_N$ of the image light to be projected from the light guide plate 2e, the transmittance F of the light control coating layer 12 is distributed as expressed by the following expression (where $0<F<1$). Here, the origin of the x axis is assumed as the start point D0 of the light control coating layer 12.

$$F(x) = x/B \times (1-(1-R)^{(N-1)}) + (1-R)^{(N-1)} \qquad (44)$$

It is noted that the transmittance F of the light control coating layer 12 may be varied exponentially in the x-axis direction as expressed by the following expression:

$$F(x) = (1-R)^{((1-x/B) \times (N-1))} \qquad (45)$$

The light control coating layer 12 may be applied to the full face of the first internal reflective surface 6.

As described above, according to the fifth embodiment, applying the light control coating layer having the transmittance distribution to the exit surface of the light guide plate 2e enables the projection of image light of uniform brightness.

Sixth Embodiment

A sixth embodiment includes a modification to the light guide plate 2e in the fifth embodiment, and in this configuration, the partially reflective surface array is divided into a plurality of segments along in the arrangement direction of the partially reflective surfaces, and the transmittance of the light control coating is varied on a segment-by-segment basis.

Figure 15A:
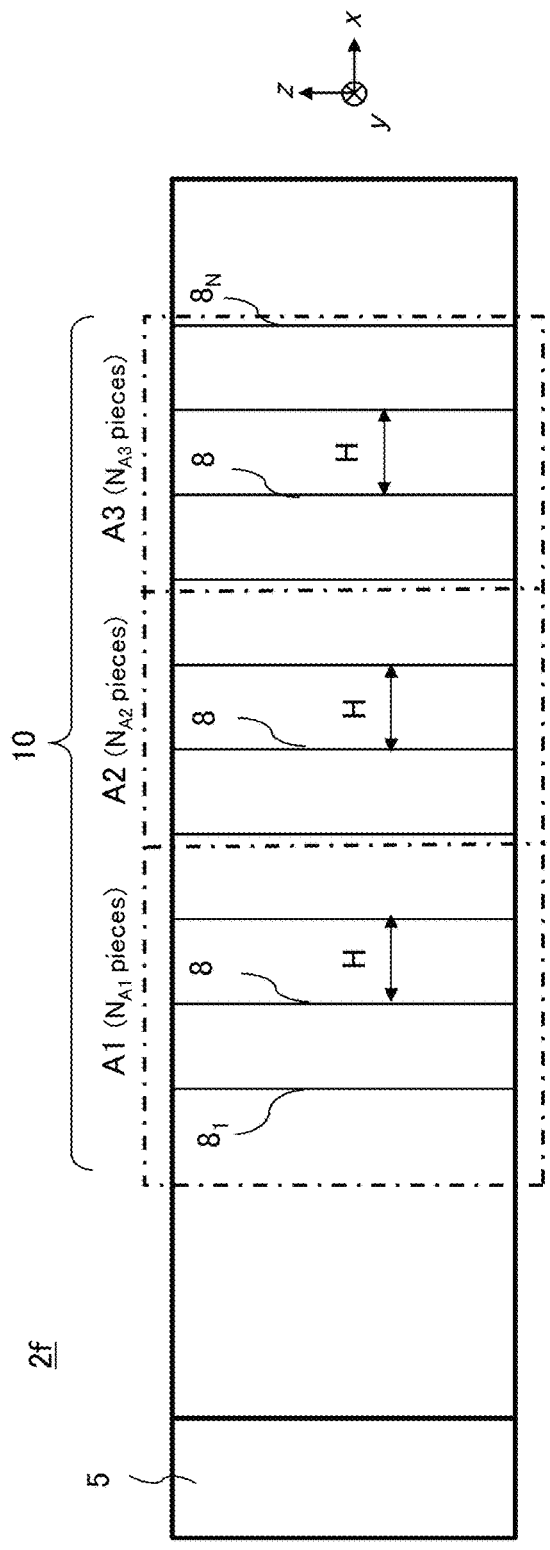
FIGS. 15A and 15B are diagrams illustrating the configuration of a light guide plate 2f according to a sixth embodiment.
Figure 15B:
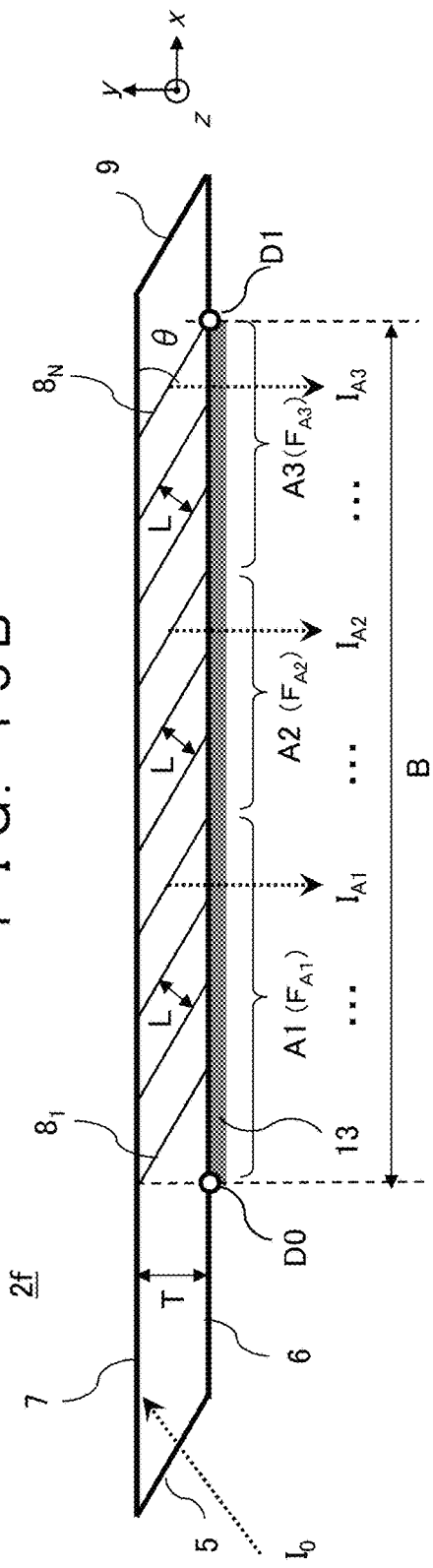

FIGS. 15A and 15B are diagrams illustrating the configuration of a light guide plate 2f according to the sixth embodiment, in which FIG. 15A is a front view and FIG. 15B is a plan view. The light guide plate 2f includes the first internal reflective surface 6 and the second internal reflective surface 7 which are approximately parallel to each other. The light guide plate 2f has the partially reflective surface array 10 therein, the partially reflective surface array 10 including the number N of partially reflective surfaces 8₁ to 8_N. Here, the partially reflective surfaces 8 are approximately equal in reflectivity R and inter-surface spacing L (width H). And a light control coating layer 13 is included on the outer side of the first internal reflective surface 6 to uniform the image brightness.

The partially reflective surface array 10 is divided into a plurality (three in the embodiment) of segments A1 to A3 along the arrangement direction of the partially reflective surfaces 8. The $N_{Ak}$ partially reflective surfaces 8 (k is an integer from 1 to 3) exist in each segment. The light control coating layer 13 is also divided corresponding to the segments A1 to A3, and the transmittance is varied. The transmittance F of the light control coating layer 13 is equal in the same segment. Between adjacent segments, the transmittance F in one segment located closer to the light guide plate end 9 is set higher than that in the other, in order to uniform the intensity distribution of the image light to be projected. In comparison with the light control coating layer 12 in the fifth embodiment which has transmittance distribution, the transmittance of the light control coating layer 13 is constant in the segment, so that the degree of difficulty in manufacturing can be decreased to achieve cost reduction.

The transmittance F of the light control coating layer 13 in the light guide plate 2f is described. The light control coating layer 13 is divided into three segments A1 to A3, and transmittance of the light control coating layer 13 in the segment Ak is assumed as $F_{Ak}$ (k is an integer from 1 to 3). Comparing transmittance between adjacent segments, the transmittance in one segment located closer to the light guide plate end 9 is set higher than that in the other in order to uniform the image light to be projected. That is, the transmittance $F_{Ak}$ and the transmittance $F_{Ak+1}$ of the light control coating layer 13 between adjacent segments are set to have the following relationship:

$$F_{Ak} < F_{Ak+1} \quad (1 \leq k \leq 2) \qquad (46)$$

Here, the example of division into three segments A1 to A3 has been described, but the number of segments may be two or may be more than three.

For example, the case where the light control coating layer 13 is divided into M is described (M is an integer of 2 or greater). It is assumed that a k-th segment from the incident surface 5 of the light guide plate 2f is Ak, that the number of partially reflective surfaces 8 existing in the segment Ak is $N_{Ak}$, and that the reflectivity is R (k is an integer from 1 to M). In this case, for projection of uniform image light from each segment, for the same reason as the above, the transmittance $F_{Ak}$ and the transmittance $F_{Ak+1}$ of the light control coating layer 13 between adjacent segments have a relationship given by:

$$F_{Ak} < F_{Ak+1} \ (1 \leq k \leq M-1) \tag{47}$$

Further, in order to equalize the light intensity $I_{Ak}$ and the light intensity $I_{A+1}$ at the segment ends of the respective adjacent segments, using width H and the number $N_{Ak}$ of partially reflective surfaces 8 in place of x position in expression (44), the relationship may be expressed by:

$$F_{Ak+1} - F_{Ak} = H \times N_{Ak+1}/B \times (1-(1-R)^{(N-1)}) \tag{48}$$

As described above, according to the sixth embodiment, applying the light control coating layer to the exit surface of the light guide plate 2f enables the projection of image light of uniform brightness. At this time, the transmittance is configured to be varied for each segment of the partially reflective surface array, so that a light guide plate capable of being easily manufactured at reduced costs can be provided.

While some embodiments according to the present invention have been described, the present invention is limited to the abovementioned embodiments, and encompasses numerous modifications. For example, the abovementioned embodiments are described in specific details for facilitating the understanding of the present invention, and are not necessarily intended to be limited to including all the configurations described above. Further, a portion of a configuration in one embodiment may be substituted by a configuration in another embodiment. A configuration in one embodiment may be added to a configuration in another embodiment. A portion of a configuration in each embodiment may be added to, removed from or substituted by another configuration.

What is claimed is:

1. A light guide plate for propagating and projecting incoming image light, comprising:
    an incident surface which image light enters;
    first and second internal reflective surfaces that are approximately parallel to each other and propagate incoming image light while totally reflecting the incoming image light; and
    a partially reflective surface array that is placed in an interior sandwiched between the first and second internal reflective surfaces, and has a plurality of partially reflective surfaces arranged therein in a direction of propagating image light, the plurality of partially reflective surfaces being inclined at a predetermined angle, the plurality of partially reflective surfaces partially reflecting the image light; and
    a uniforming element that uniforms intensity distribution of image light which is reflected by the partially reflective surface array to be projected from the light guide plate,
    wherein as the uniforming element, the partially reflective surface array is divided into a plurality of segments along the direction of propagating image light, and the uniforming element has different optical configurations between the segments, and
    wherein the reflectivity R of the plurality of partially reflective surfaces falls within a range given by the following expression:

$$R \leq 6/(EB + 2 \times ER \times \tan(FOV/2))$$

where EB (mm) is an eye box, ER (mm) is an eye relief, and FOV (degree) is a field of view in a horizontal direction of image light to be projected.

2. The light guide plate according to claim 1,
    wherein the segments differ from each other in an inter-surface spacing L of the plurality of partially reflective surfaces, and
    wherein the plurality of partially reflective surfaces are arranged to satisfy LAk+1<LAk, where LAk is the inter-surface spacing of partially reflective surfaces of the plurality of partially reflective surfaces located in a k-th segment of the segments from the incident surface, and LAk+1 is the inter-surface spacing of partially reflective surfaces of the plurality of partially reflective surfaces located in a (k+1)-th segment of the segments from the incident surface.

3. The light guide plate according to claim 2, wherein the plurality of partially reflective surfaces are approximately equal in reflectivity R to one another.

4. The light guide plate according to claim 1, wherein the plurality of partially reflective surfaces are arranged to satisfy the following expression:

$$L_{Ak} \times (1-R)^{N_{Ak}} \leq L_{Ak+1} < L_{Ak}$$

where R is reflectivity of the plurality of partially reflective surfaces, $L_{Ak}$ is an inter-surface spacing of the partially reflective surfaces located in the k-th segment from the incident surface, and $N_{Ak}$ is the number of partially reflective surfaces.

5. The light guide plate according to claim 1, wherein the plurality of partially reflective surfaces differ in reflectivity R between the segments.

6. The light guide plate according to claim 1,
    wherein of the first and second internal reflective surfaces, all or a portion of an outer side of a surface from which image light exits is applied with a light control coating layer, and
    wherein the uniforming element varies transmittance of the light control coating layer among the plurality of segments.

7. The light guide plate according to claim 1, wherein of the first and second internal reflective surfaces, all or a portion of an outer side of a surface from which image light exits is applied with a coating layer having either predetermined reflection characteristics or transmission characteristics.

8. The light guide plate according to claim 1, wherein at least one of the plurality of partially reflective surfaces of the partially reflective surface array has different reflectivity.

9. An image display apparatus displaying an image, comprising:
    an image generation unit that generates image light of an image to be displayed;
    a light guide plate that propagates and projects incoming image light; and
    a coupling prism that emits image light generated by the image generation unit to the light guide plate,
    wherein the light guide plate includes:
        an incident surface which image light enters,
        first and second internal reflective surfaces that are approximately parallel to each other and propagate incoming image light while totally reflecting the incoming image light, and
        a partially reflective surface array that is placed in an interior sandwiched between the first and second internal reflective surfaces, and has a plurality of partially reflective surfaces arranged therein in a direction of propagating image light, the plurality of partially reflective surfaces being inclined at a predetermined angle, the plurality of partially reflective surfaces partially reflecting the image light, and a uniforming element that uniforms intensity distribution of image light which is reflected by the partially reflective surface array to be projected from the light guide plate, wherein as the uniforming element, the partially reflective surface array is divided into a plurality of segments along the direction of propagating image light, and the uniforming element has different optical configurations between the segments, and wherein the reflectivity R of the plurality of partially reflective surfaces falls within a range given by the following expression:

$$R \leq 6/(EB+2\times ER\times \tan(FOV/2))$$

where EB (mm) is an eye box, ER (mm) is an eye relief, and FOV (degree) is a field of view in a horizontal direction of image light to be projected.

10. A head-mounted display worn on a head of a user to display an image to the user, comprising:

an image display apparatus that displaying an image;
a sensing section that detects external information;
a communication section that communicates with external equipment;
a power supply section that supplies electric power;
a storage section that stores information;
an operation input section that receives operation of the user; and
a control section that controls the head-mounted display, wherein the image display apparatus includes
an image generation unit that generates image light of an image to be displayed,
a light guide plate that propagates and projects incoming image light, and
a coupling prism that emits image light generated by the image generation unit to the light guide plate, and wherein the light guide plate includes:
an incident surface which image light enters,
first and second internal reflective surfaces that are approximately parallel to each other and propagate incoming image light while totally reflecting the incoming image light, and
a partially reflective surface array that is placed in an interior sandwiched between the first and second internal reflective surfaces, and has a plurality of partially reflective surfaces arranged therein in a direction of propagating image light, the plurality of partially reflective surfaces being inclined at a predetermined angle, the plurality of partially reflective surfaces partially reflecting the image light, and
a uniforming element that uniforms intensity distribution of image light which is reflected by the partially reflective surface array to be projected from the light guide plate, wherein as the uniforming element, the partially reflective surface array is divided into a plurality of segments along the direction of propagating image light, and the uniforming element has different optical configurations between the segments, and wherein the reflectivity R of the plurality of partially reflective surfaces falls within a range given by the following expression:

$$R \leq 6/(EB+2\times ER\times \tan(FOV/2))$$

where EB (mm) is an eye box, ER (mm) is an eye relief, and FOV (degree) is a field of view in a horizontal direction of image light to be projected.

* * * * *